US012032603B2

(12) United States Patent
Quatro

(10) Patent No.: US 12,032,603 B2
(45) Date of Patent: Jul. 9, 2024

(54) METHOD AND SYSTEM FOR INTERPRETING INPUTTED INFORMATION

(71) Applicant: Quatro Consulting LLC, Austin, TX (US)

(72) Inventor: Frank Quatro, Austin, TX (US)

(73) Assignee: Quatro Consulting LLC, Austin, TX (US)

( * ) Notice: Subject to any disclaimer, the term of this patent is extended or adjusted under 35 U.S.C. 154(b) by 109 days.

(21) Appl. No.: 17/769,700

(22) PCT Filed: Oct. 15, 2019

(86) PCT No.: PCT/US2019/000053
§ 371 (c)(1),
(2) Date: Apr. 15, 2022

(87) PCT Pub. No.: WO2021/076089
PCT Pub. Date: Apr. 22, 2021

(65) Prior Publication Data
US 2022/0391420 A1 Dec. 8, 2022

(51) Int. Cl.
*G06F 7/02* (2006.01)
*G06F 16/00* (2019.01)
*G06F 16/22* (2019.01)
*G06F 16/25* (2019.01)
*G06F 16/28* (2019.01)
*G06N 20/00* (2019.01)

(52) U.S. Cl.
CPC ........ *G06F 16/288* (2019.01); *G06F 16/2282* (2019.01); *G06F 16/254* (2019.01); *G06N 20/00* (2019.01)

(58) Field of Classification Search
CPC .. G06F 16/288; G06F 16/2282; G06F 16/254; G06N 20/00
See application file for complete search history.

(56) References Cited

U.S. PATENT DOCUMENTS

| | | | |
|---|---|---|---|
| 10,819,556 B1* | 10/2020 | Rangasamy | H04L 41/026 |
| 11,569,981 B1* | 1/2023 | Mishra | G06F 21/64 |
| 2017/0213132 A1 | 7/2017 | Hammond et al. | |
| 2017/0236060 A1* | 8/2017 | Ignatyev | G06N 5/01 |
| | | | 706/46 |
| 2018/0129953 A1 | 5/2018 | Saxena et al. | |

OTHER PUBLICATIONS

International Application Serial No. PCT/US2019000053, International Search Report mailed Feb. 6, 2020, 2 pgs.
International Application Serial No. PCT/US2019000053, International Written Opinion mailed Feb. 6, 2020, 11 pgs.

* cited by examiner

*Primary Examiner* — Bruce M Moser
(74) *Attorney, Agent, or Firm* — Schwegman Lundberg & Woessner, P.A.

(57) ABSTRACT

Methods and systems for interpreting inputted information are described herein. In some embodiments, a method comprises processing inputted information wherein processing inputted information uses one or more intelligence modules using one or more intelligence models to process the inputted information; making, by the one or more intelligence modules, one or more decisions about inputted information based on the one or more intelligence models; learning, by the one or more intelligence modules, to update the one or more intelligence models; and interpreting inputted information based on the one or more decisions.

33 Claims, 20 Drawing Sheets

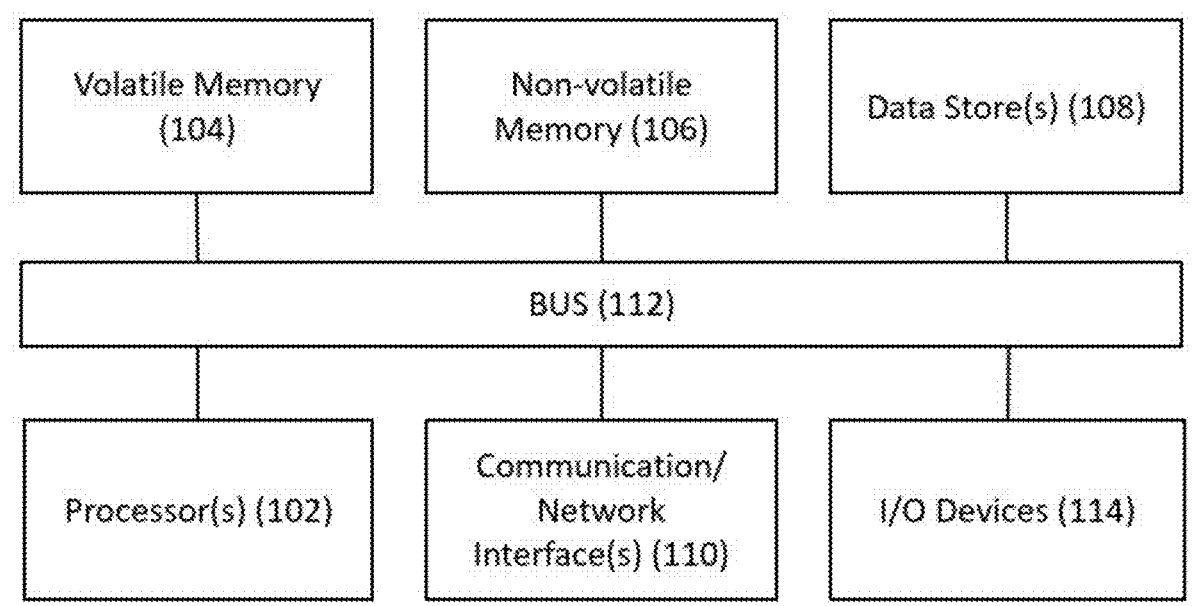
Figure 1 - Computing Device (100)

Figure 2 - Computing System (200)
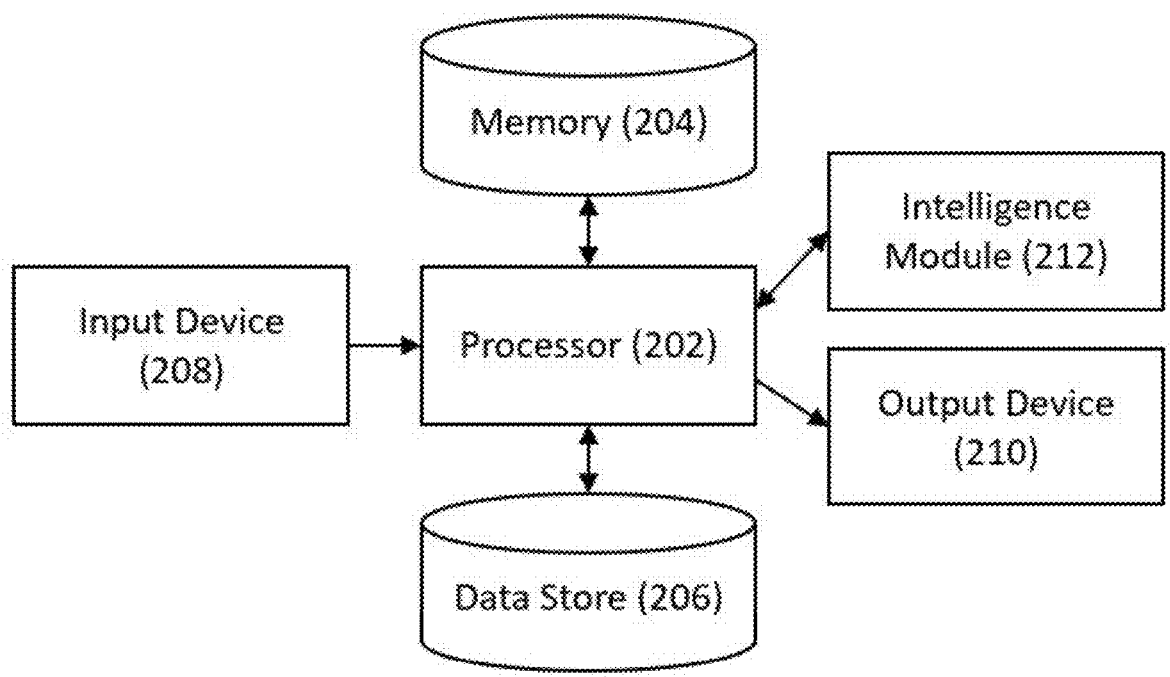

Figure 3 - Hyperintelligence System (300)
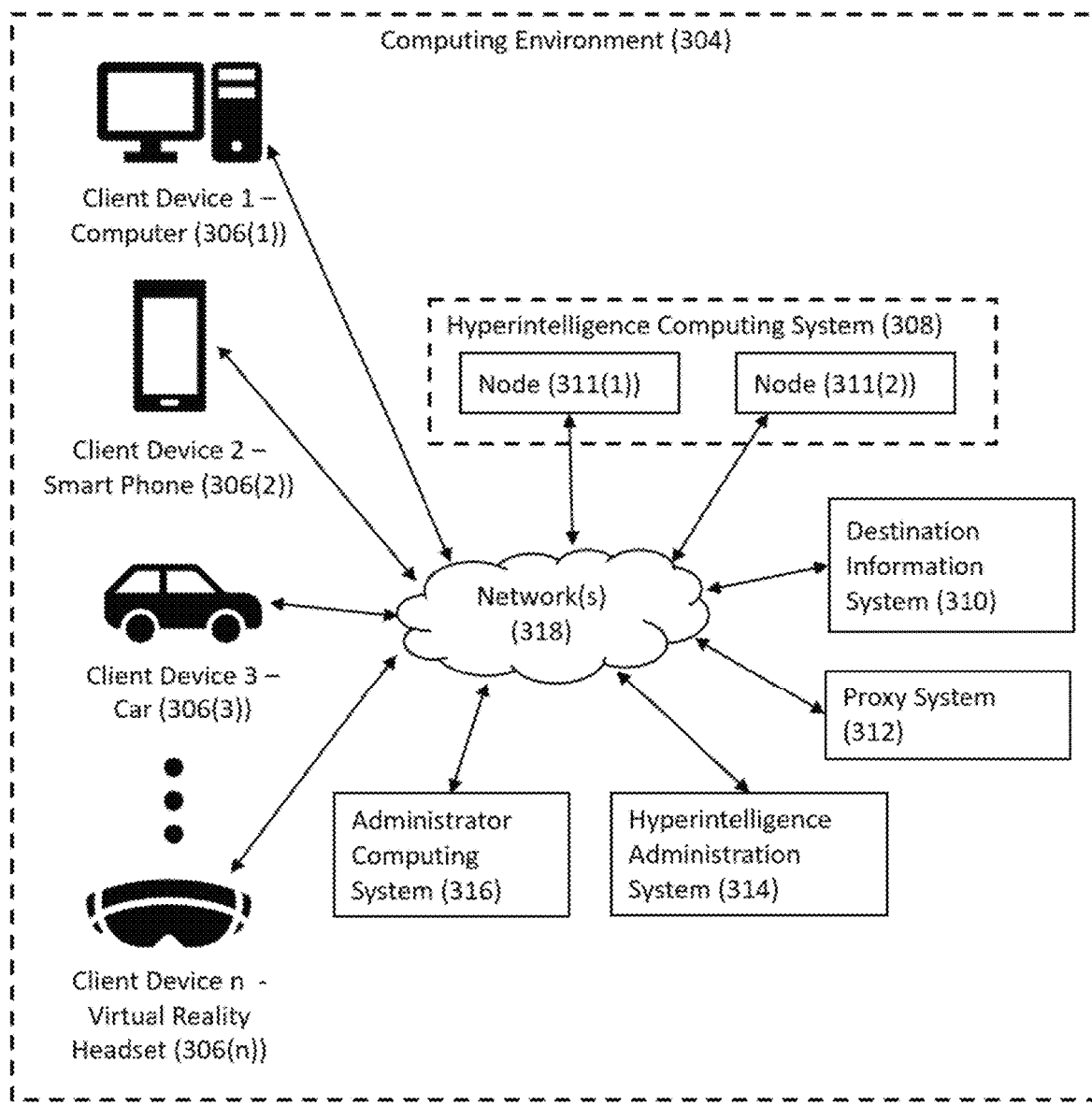

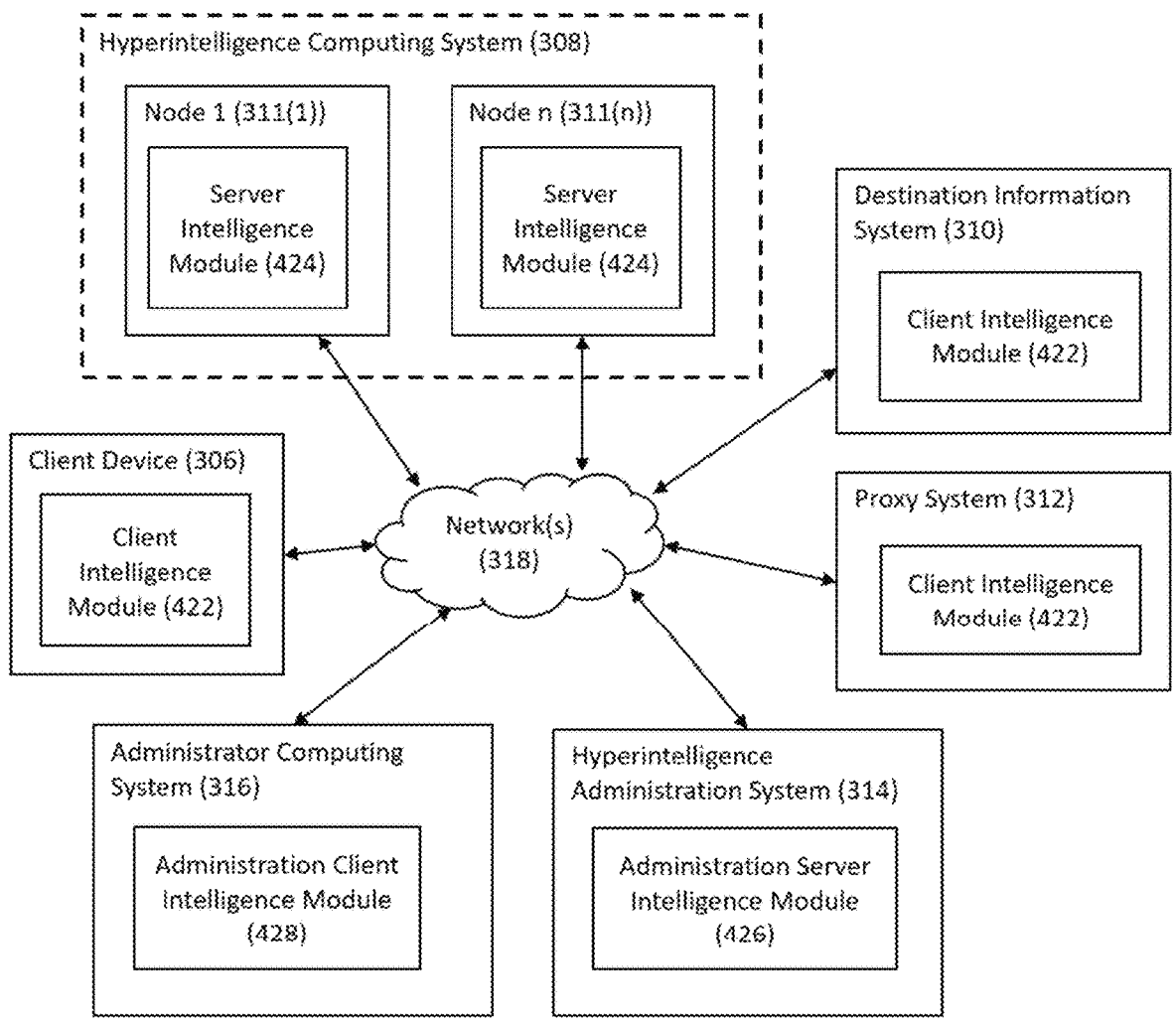
Figure 4 - Hyperintelligence System (300)

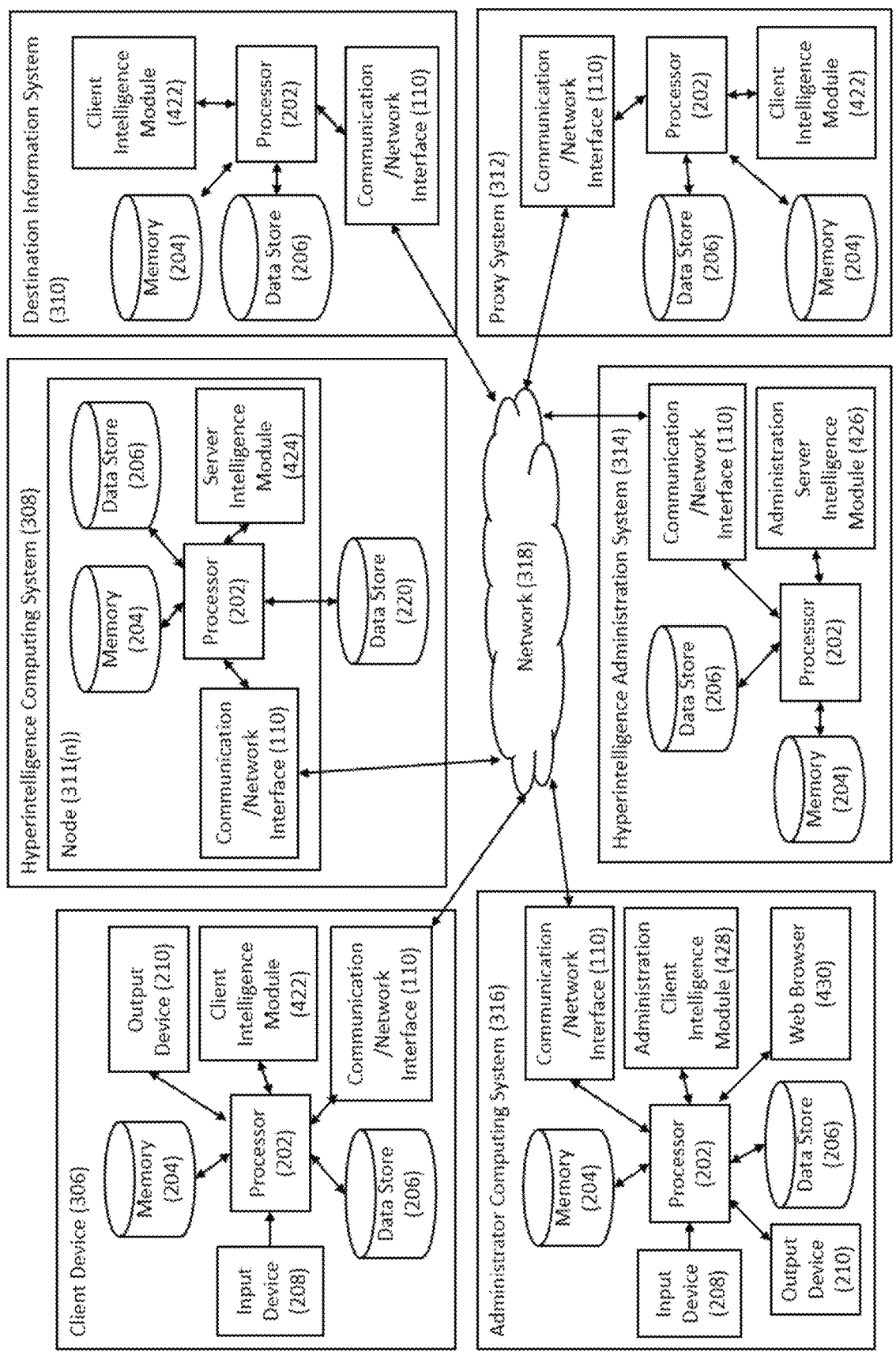
Figure 5 - Hyperintelligence System (300)

Figure 6 - Hyperintelligence Deployment Configuration: All Components
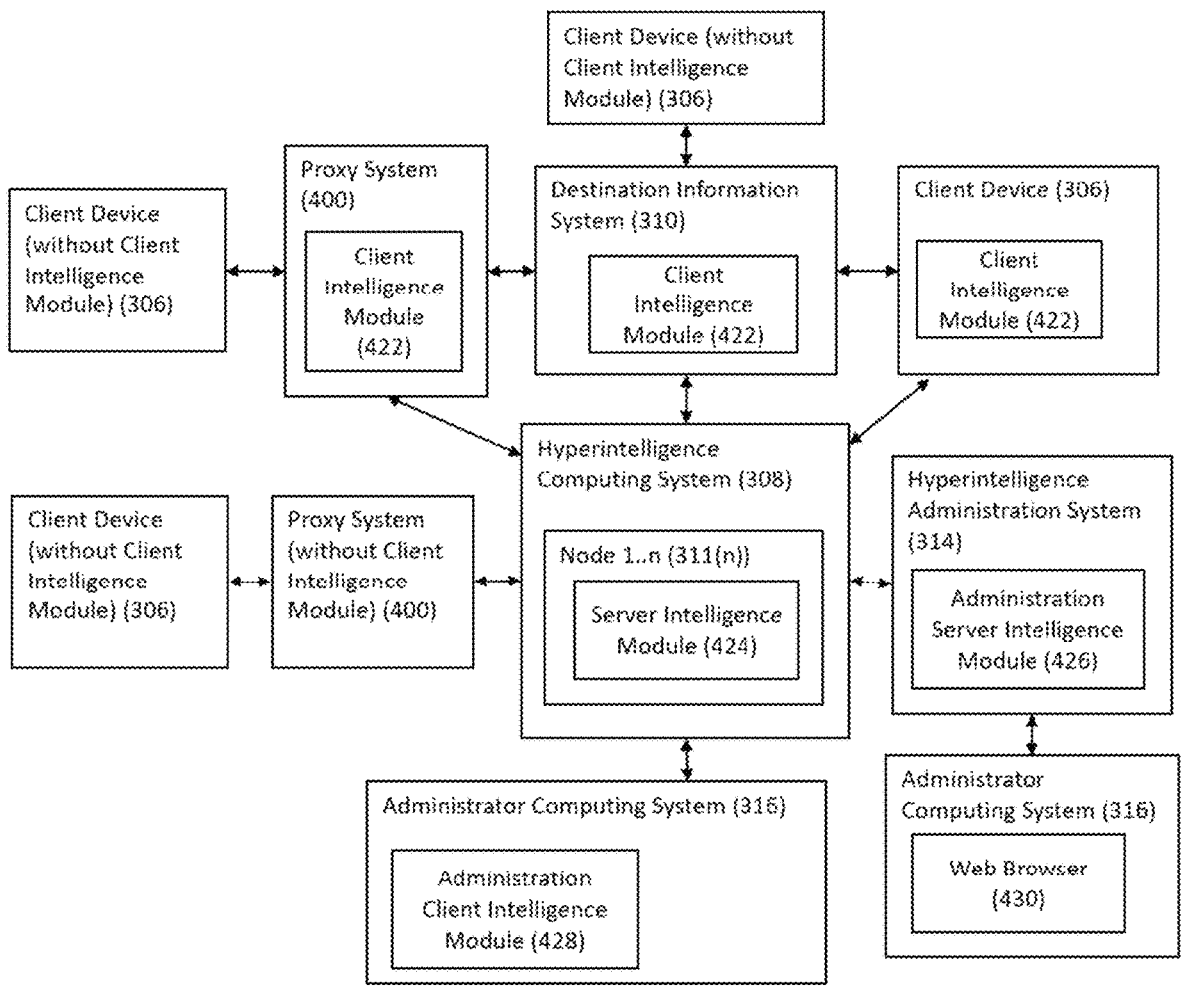

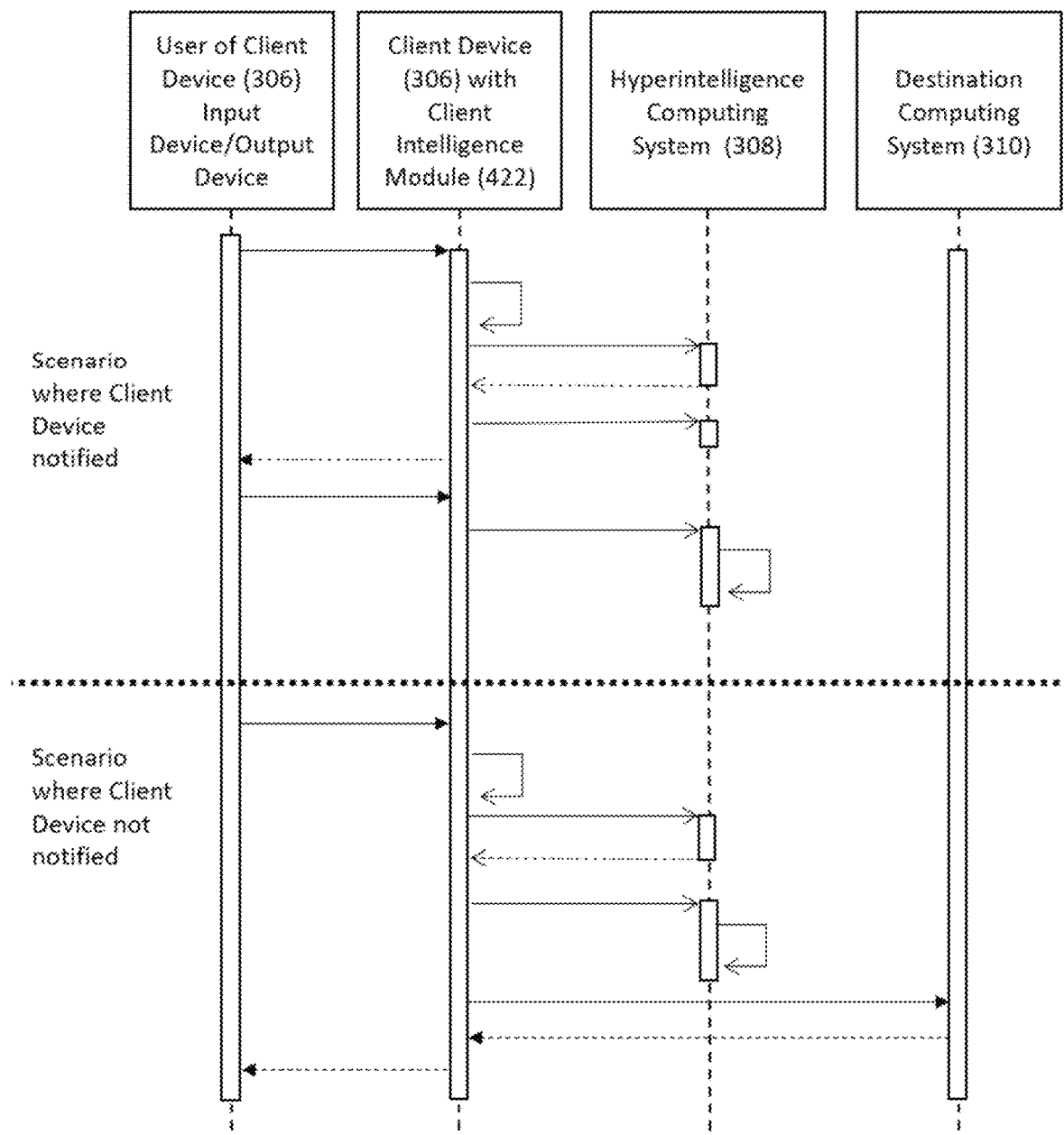
Figure 7 - Sequence Diagram: Client Intelligence Module on Client Device (Data Quality)

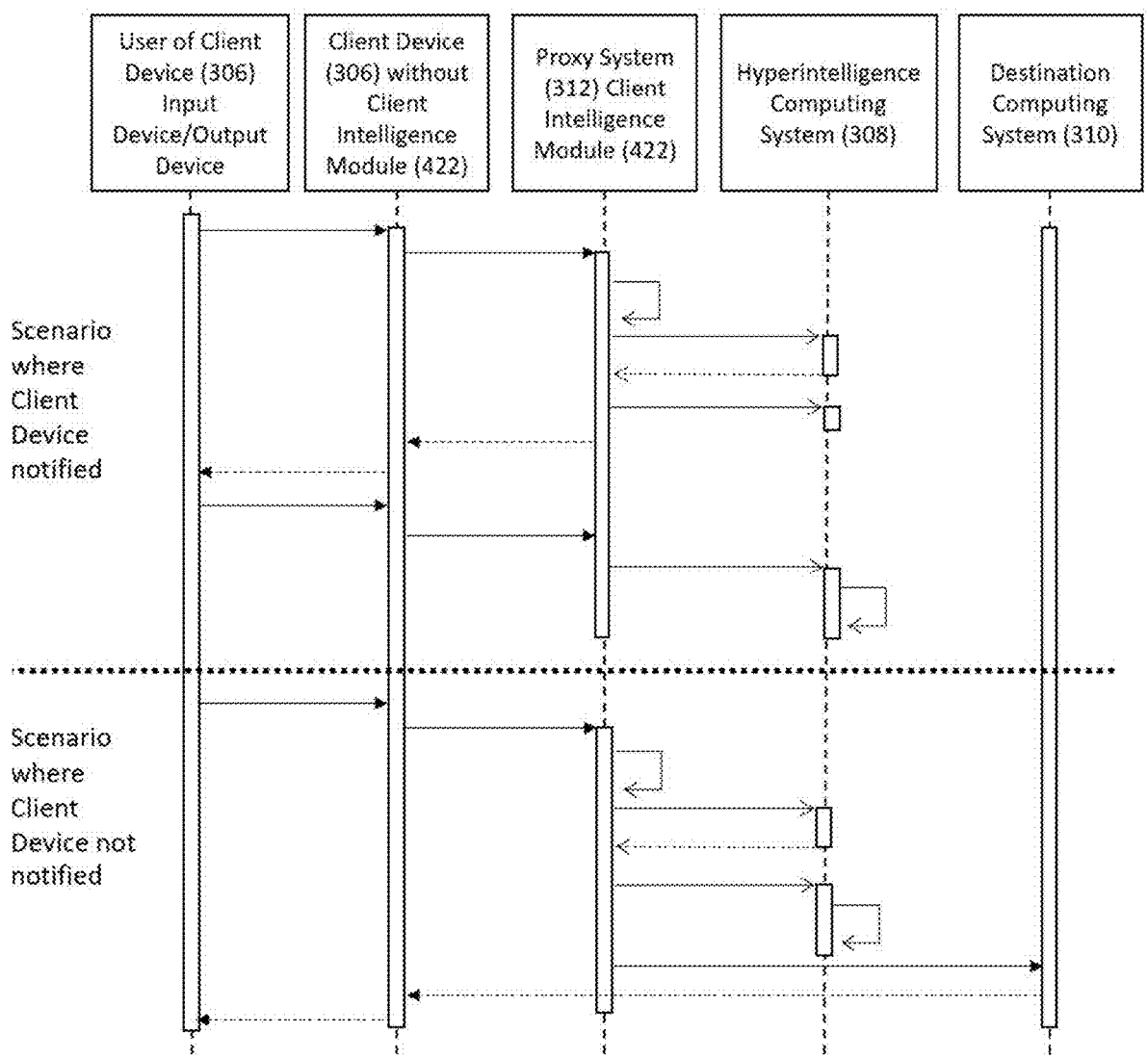
Figure 8 - Sequence Diagram: Client Intelligence Module on Proxy System (Data Quality)

Figure 9 - Sequence Diagram: Proxy forwards to Hyperintelligence Computing System (Data Quality)
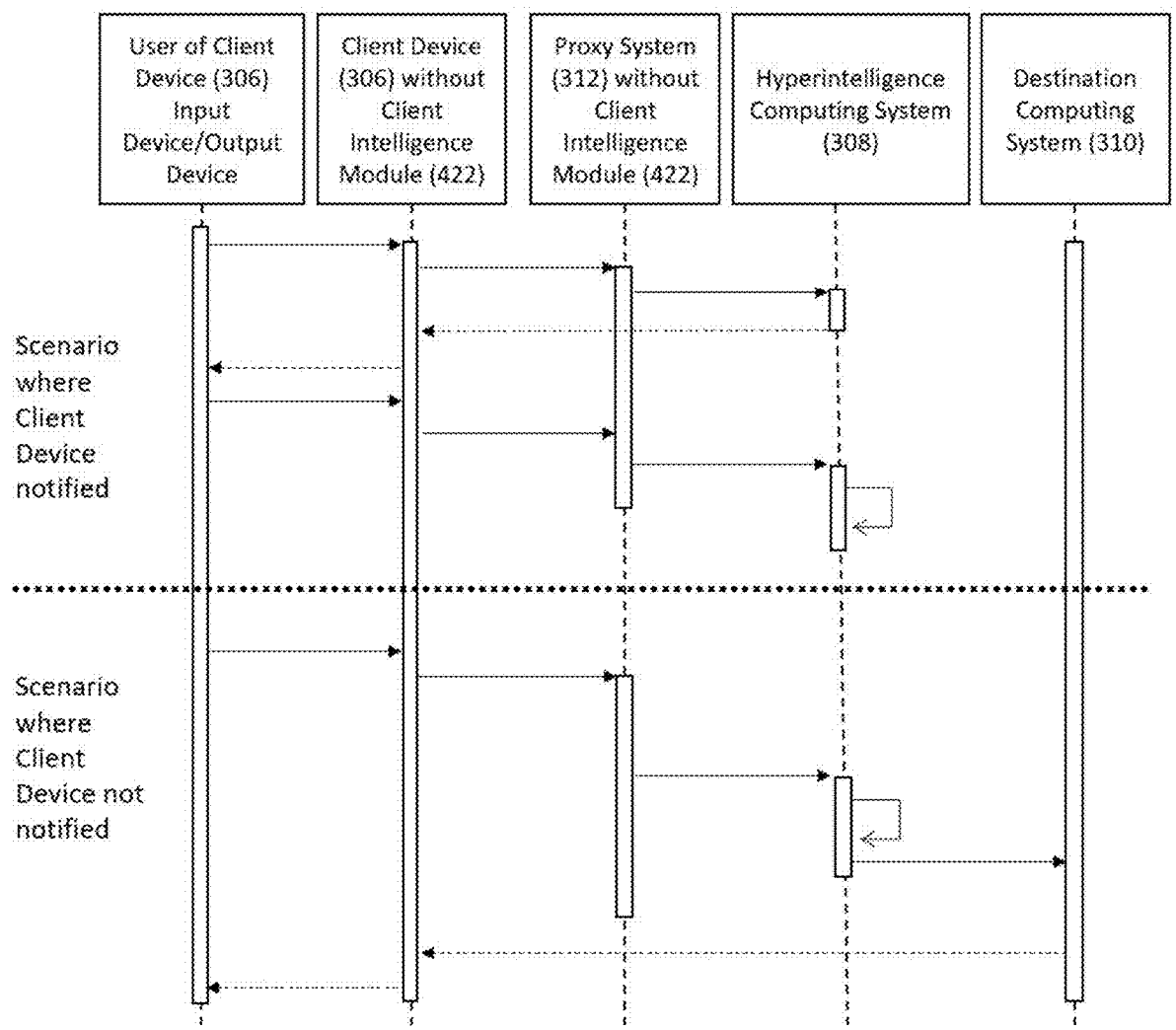

Figure 10 - Sequence Diagram: Client Intelligence Module on Destination Computing System (Data Quality)
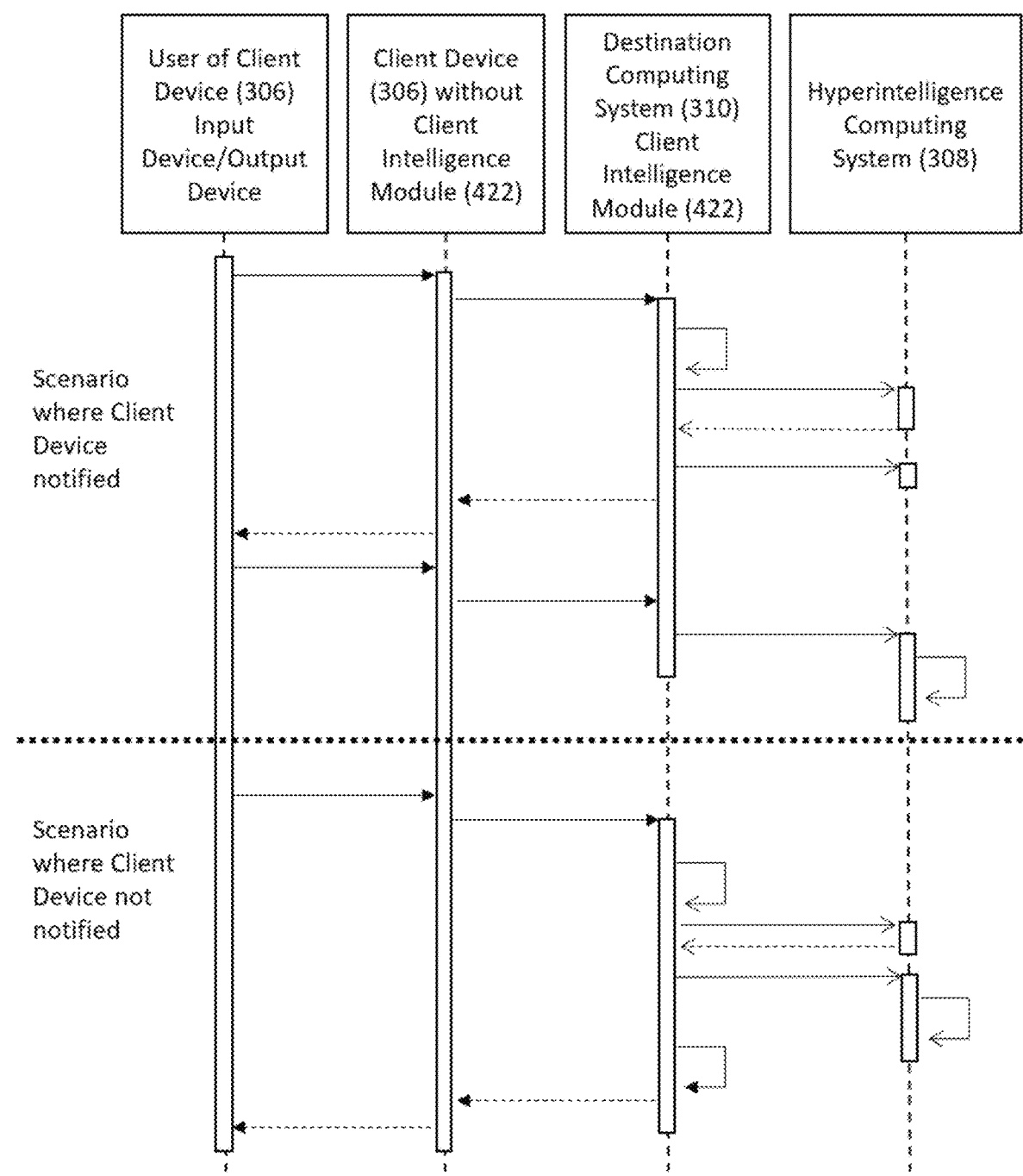

Figure 11 - Sequence Diagram: Feedback from User of Administration System & Real-time Learning
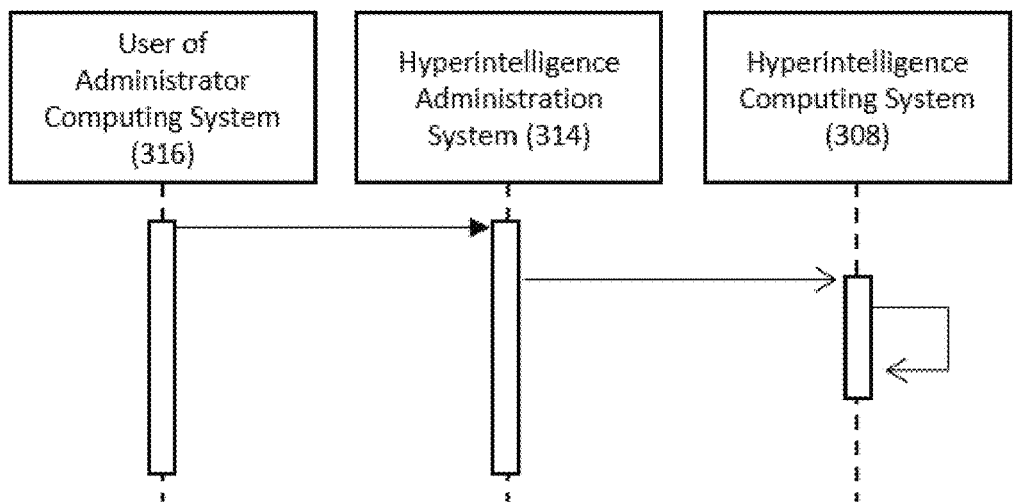

Figure 12 - Sequence Diagram: Client Module on Client Device (Ecommerce)
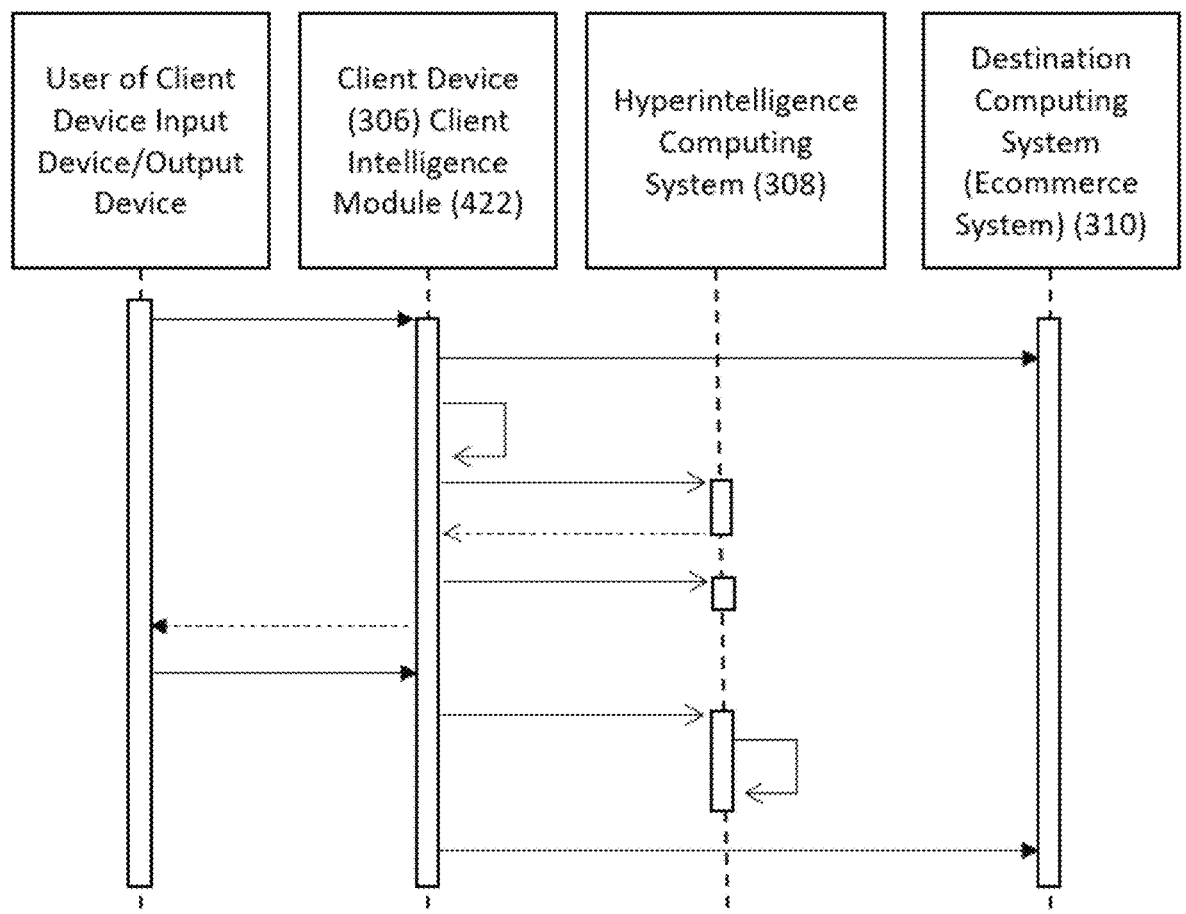

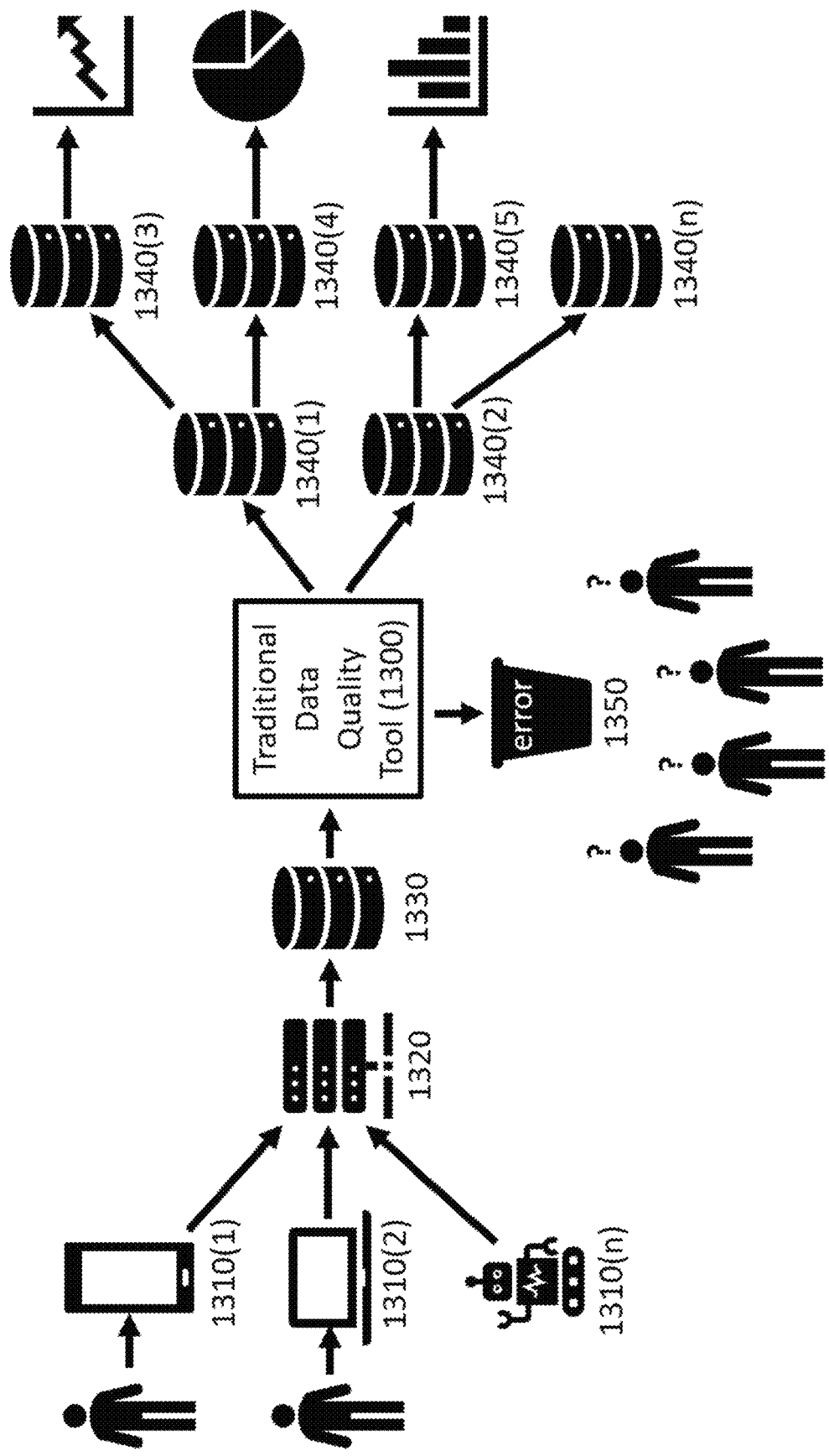

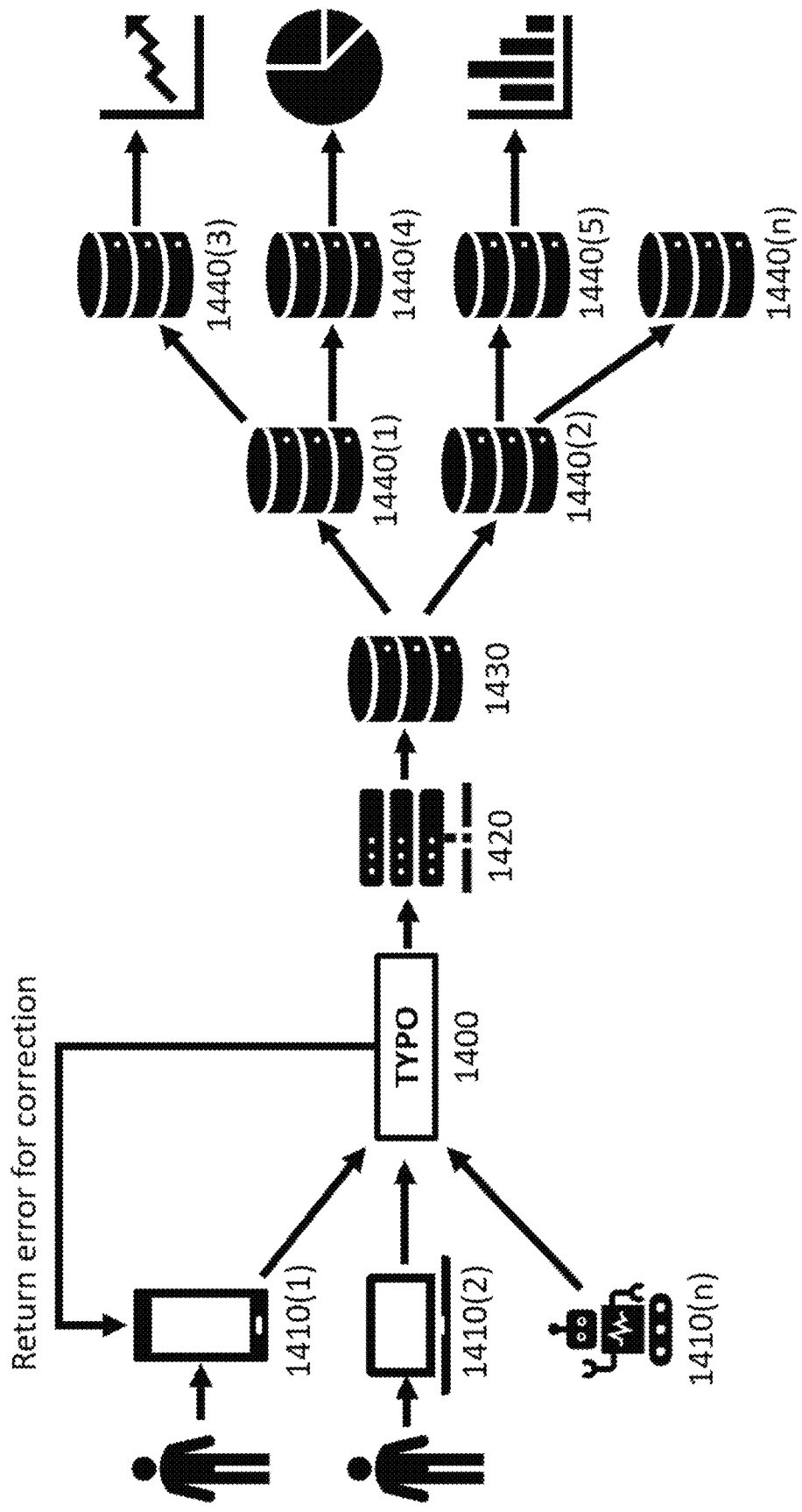

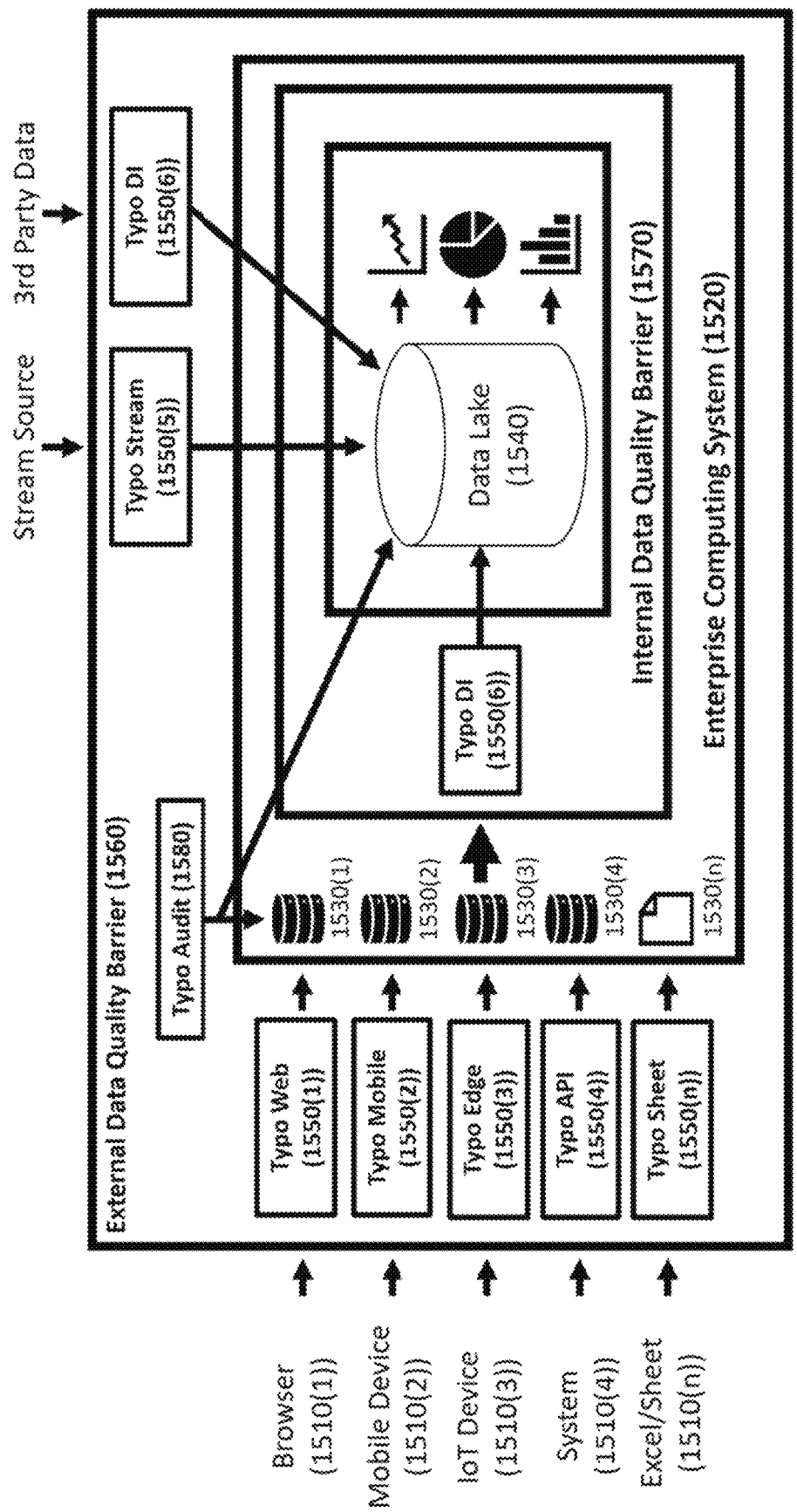
Figure 15 – Typo Services

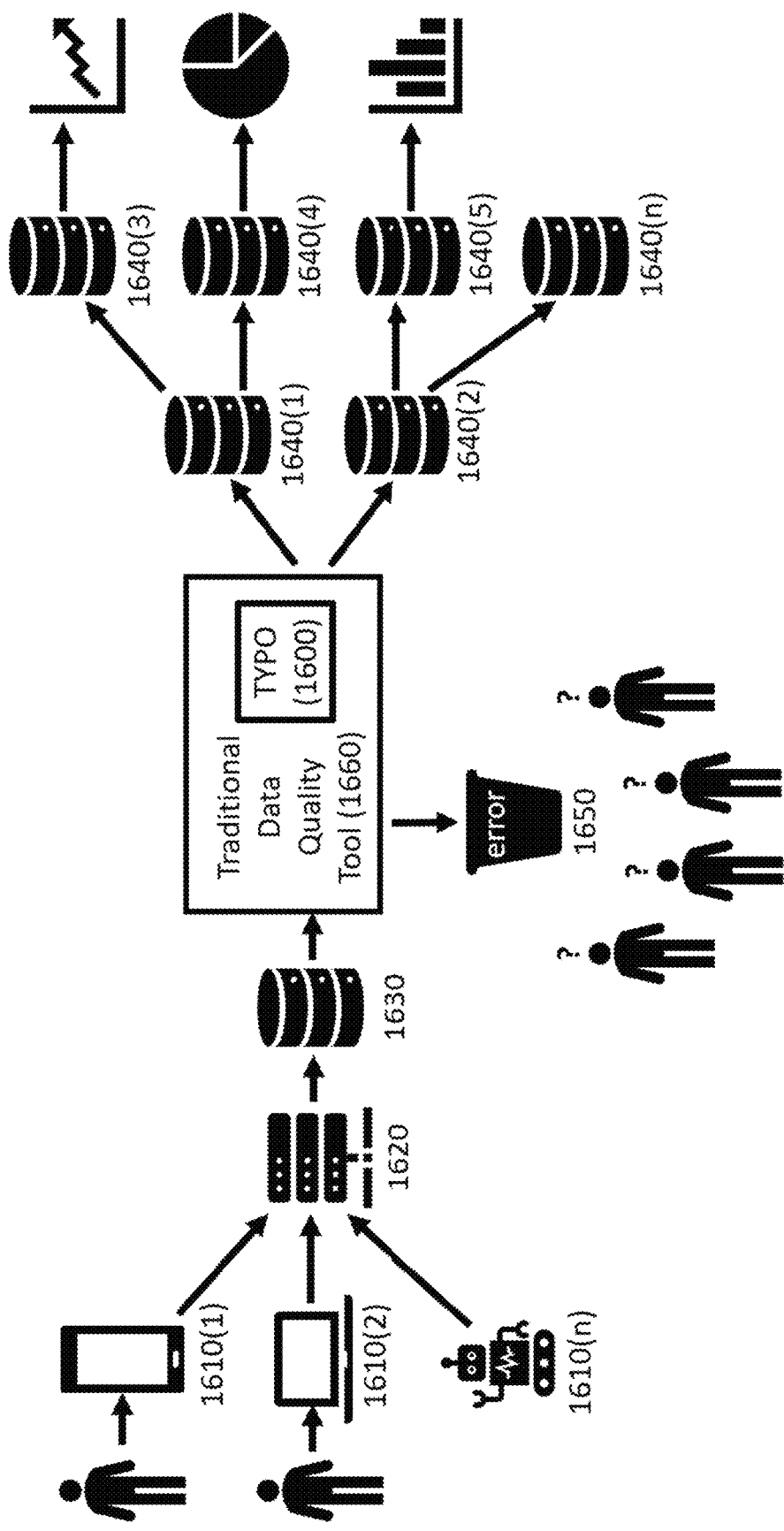
Figure 16 - Data Quality - Modern Typo Solution integrated into Traditional Tool Figure 17 – Hyperintelligence System Lifecycle
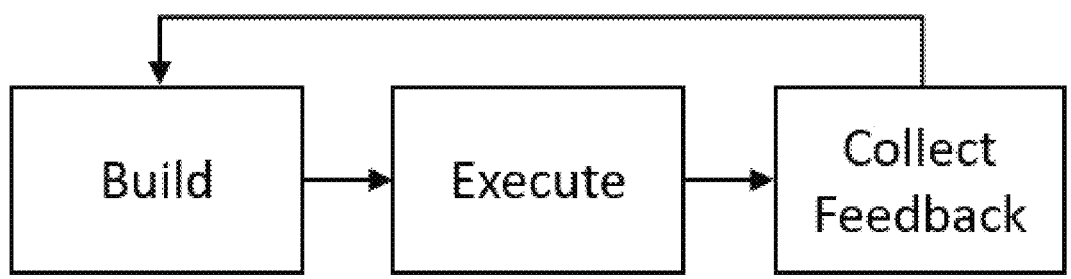

Figure 18 – Prepare Model Build DAG
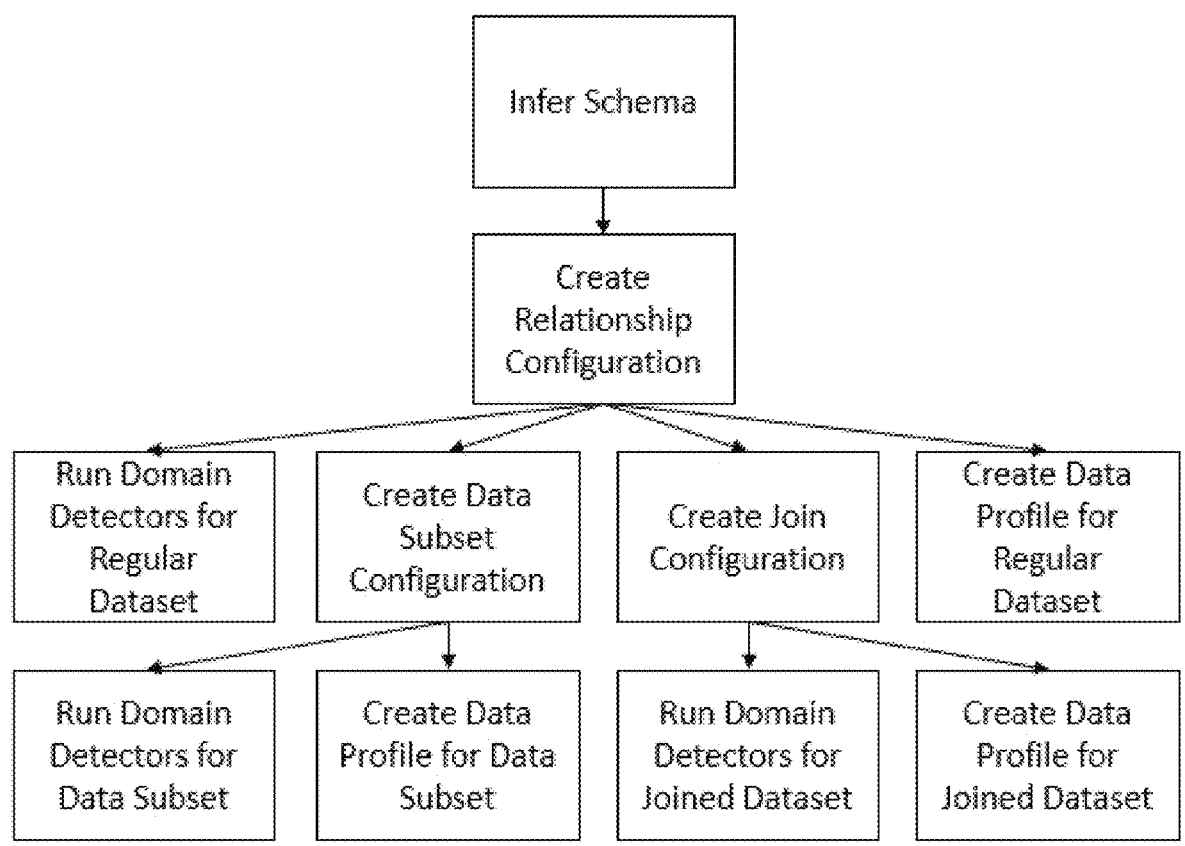

Figure 19 – Build Predictor Model DAG
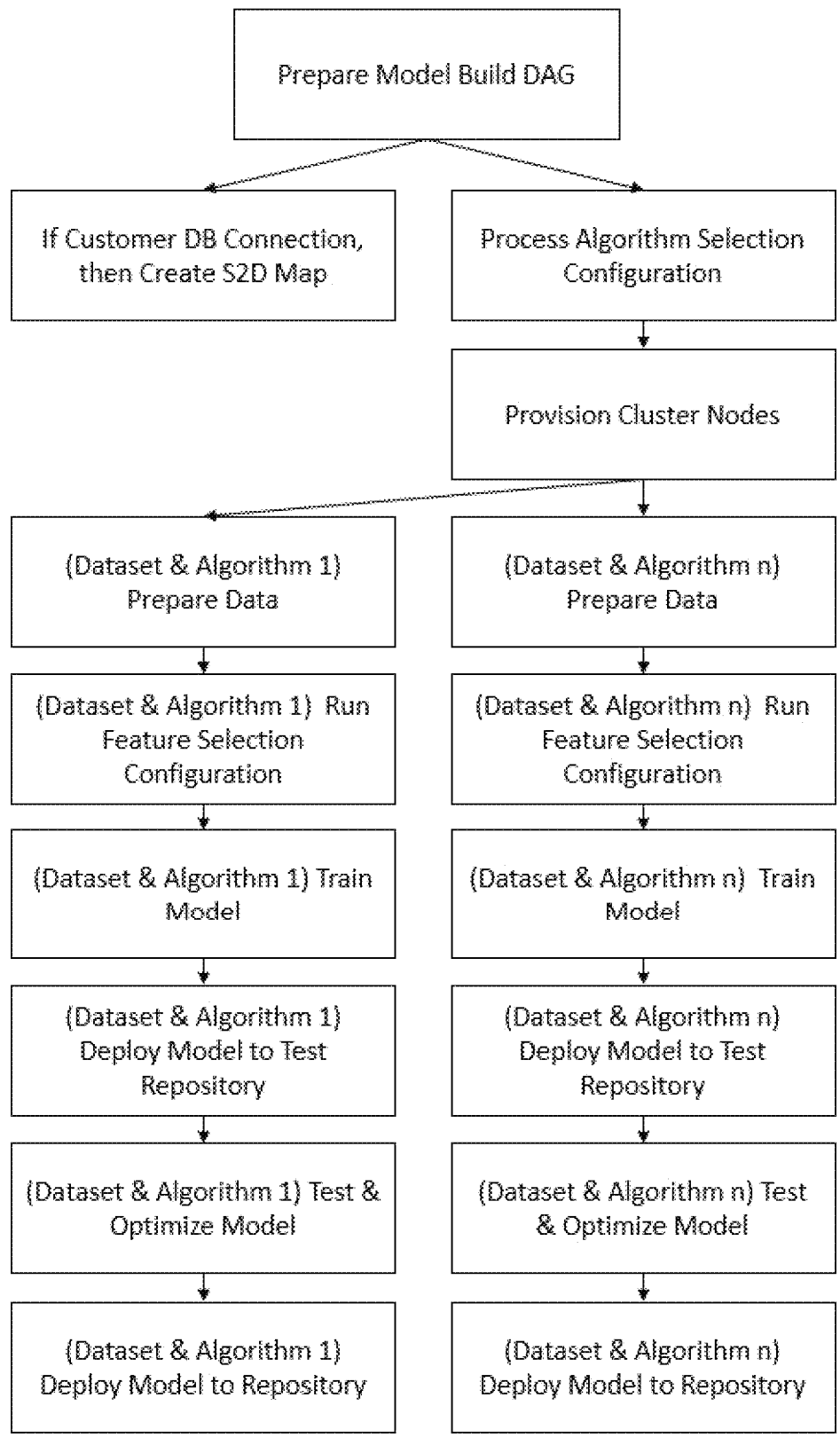

Figure 20 – Build Profiler Model DAG
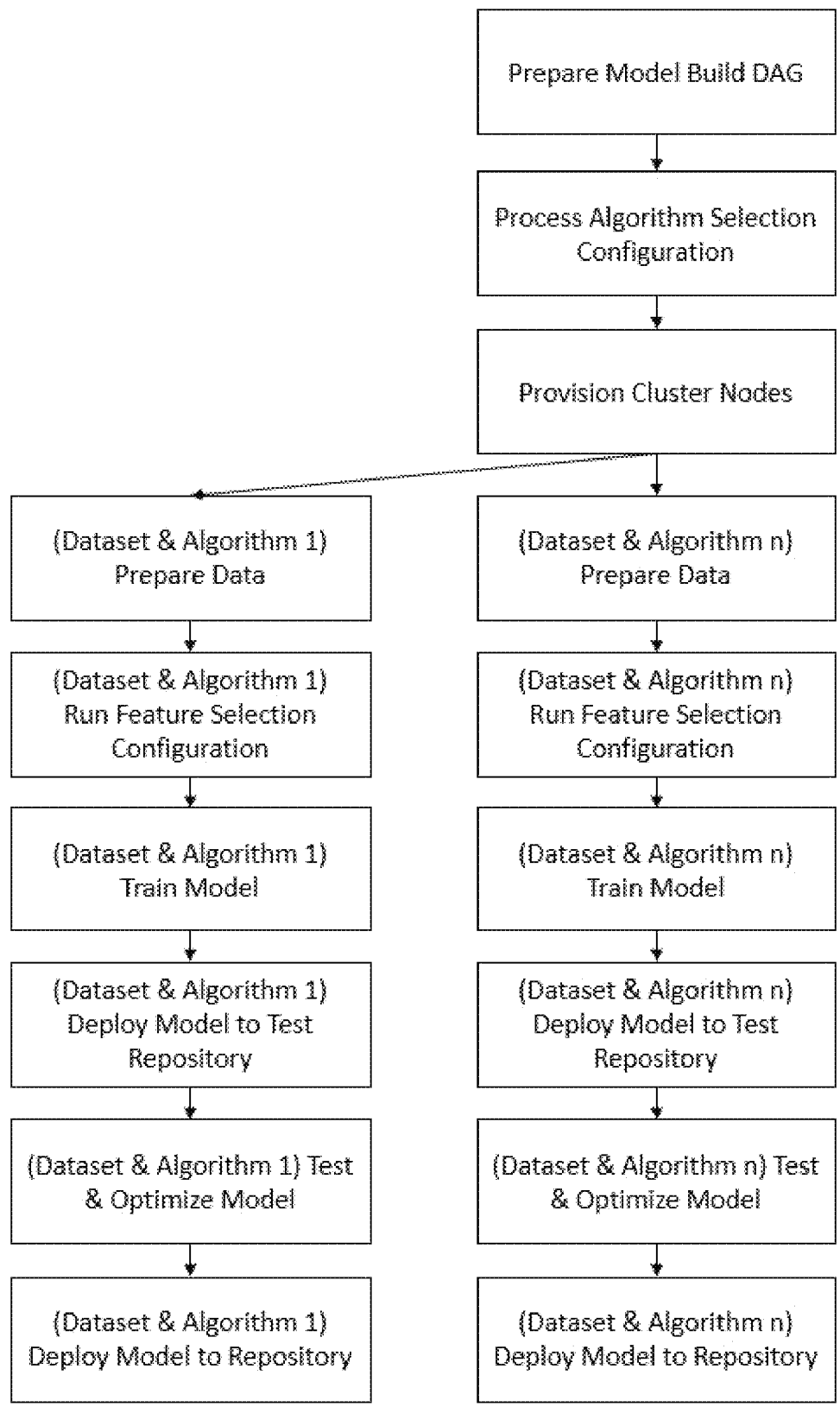

METHOD AND SYSTEM FOR INTERPRETING INPUTTED INFORMATION

This application is a U.S. National Stage Filing under 35 U.S.C. 371 from International Application No. PCT/US2019/000053, filed on Oct. 15, 2019, and published as WO 2021/076089 A1 on Apr. 22, 2021, which is incorporated by reference herein in its entirety.

TECHNICAL FIELD

The present disclosure relates to methods and systems for interpreting inputted information.

BACKGROUND

Enabling machines, devices and systems to make decisions and perform tasks that would normally require human intelligence is a valuable technological advancement. Performing artificial intelligence and automated decision making, in real-time with a variety of information and immediately learning from good or bad decisions and new information, is valuable innovation with multiple uses and applications. An example of one application is data error correction. Traditional information decision tools are reactive because they attempt to address information and/or decision errors after they are persisted in a computing system. Decision and/or information errors may reside or occur in a computing system for days or months. Inputted information and/or decisions related to inputted information introduce system risk that the information and/or decisions are not accurate. Accurate information and decisions reduce the overall risk in meeting a system's goal. Without this foundation, decision makers cannot make decisions with confidence. What is needed is a data or information processing, intelligence and decision system that addresses these issues and more.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 1 is a block diagram of a computing device, in accordance with an illustrative embodiment;

FIG. 2 is a block diagram of a computing system, in accordance with an illustrative embodiment;

FIG. 3 is a block diagram of a hyperintelligence system and one or more networks and computing environment, in accordance with some embodiments;

FIG. 4 illustrate a block diagram of a hyperintelligence system, in accordance with some embodiments;

FIG. 5 illustrates a detailed block diagram of a hyperintelligence system, in accordance with some embodiments;

FIG. 6 illustrates a block diagram to illustrate various configurations of a hyperintelligence system, in accordance with some embodiments.

FIG. 7 illustrates a sequence diagram, in accordance with some embodiments.

FIG. 8 illustrates a sequence diagram, in accordance with some embodiments.

FIG. 9 illustrates a sequence diagram, in accordance with some embodiments.

FIG. 10 illustrates a sequence diagram, in accordance with some embodiments.

FIG. 11 illustrates a sequence diagram, in accordance with some embodiments.

FIG. 12 illustrates a sequence diagram, in accordance with some embodiments.

FIG. 13 illustrates a prior art traditional data quality tool implementation;

FIG. 14 illustrates TYPO (IS A TRADEMARK/SERVICEMARK OF QUATRO CONSULTING LLC) in the context of a data quality application of a hyperintelligence system, in accordance with some embodiments;

FIG. 15 illustrates TYPO (IS A TRADEMARK/SERVICEMARK OF QUATRO CONSULTING LLC) data quality barrier for enterprise information systems, in accordance with some embodiments; and FIG. 16 illustrates a traditional data quality tool using TYPO (IS A TRADEMARK/SERVICEMARK OF QUATRO CONSULTING LLC), in accordance with some embodiments;

FIG. 17 illustrates a flow diagram of a hyperintelligence system lifecycle, in accordance with some embodiments;

FIG. 18 illustrates a schematic diagram of a directed acyclic graph, in accordance with some embodiments;

FIG. 19 illustrates a schematic diagram of a directed acyclic graph, in accordance with some embodiments;

FIG. 20 illustrates a schematic diagram of a directed acyclic graph, in accordance with some embodiments.

DETAILED DESCRIPTION

In the following description, for the purposes of explanation, numerous specific details are set forth in order to provide a thorough understanding. Some embodiments may be practiced without these specific details. Features described in one embodiment may be combined with features described in a different embodiment. In some examples, well-known structures and devices are described with reference to block diagrams in order to avoid unnecessarily obscuring the present invention.

According to one embodiment, the methods and systems described herein are implemented by one or more general-purpose and/or special-purpose computing devices. As shown in FIG. 1, computing device 100 can include one or more processors 102, volatile memory 104 (e.g., RAM), non-volatile memory 106 (e.g., one or more hard disk drives (HDDs), other magnetic or optical storage media, one or more solid state drives (SSDs) such as a flash drive or other solid state storage media, one or more hybrid magnetic and solid state drives), zero or more data store(s) 108, or zero or more virtual storage volumes, such as a cloud storage, or a combination of such physical storage volumes and virtual storage volumes or arrays thereof), zero or more communication/network interfaces 110, and communication bus 112. User interfaces can include graphical user interface (GUI) (e.g., a touchscreen, a display, etc.) or one or more other input/output (I/O) devices 114 (e.g., a mouse, a keyboard, sensor, etc.). Non-volatile memory 106 may store an operating system, one or more applications, and information/data such that, for example, computer instructions of operating system and/or applications are executed by processor(s) 102 out of volatile memory 104. Information or data can be entered using an input device of or received from other I/O device(s) 114. Various elements of computing device 100 can communicate via communication bus 112. Computing device 100 as shown in FIG. 1 is shown merely as an example, as the methods and systems described herein can be implemented by any computing or processing environment and with any type of machine or set of machines that can have suitable hardware and/or software capable of operating as described herein.

Referring now to FIG. 2, a computing system 200 in which the methods and systems described herein are executed or deployed in accordance with an illustrative embodiment is shown. Computing system 200 can include one or more processors 202, memory 204, one or more data store(s) 206 (e.g., RAM) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof). Computing system 200 also includes one or more other input/output (I/O) devices 208, 210. In accordance with the methods and systems described herein, computing system 200 includes an intelligence module 212. Memory 204, data store 206, input/output devices 208, 210 and intelligence module 212 may be communicatively coupled to processor 202 via one or more networks, communication buses or wired or wireless links. Computing system 200 as shown in FIG. 2 is shown merely as an example, as the methods and systems described herein can be implemented by any computing or processing environment and with any type of machine or set of machines that can have suitable hardware and/or software capable of operating as described herein. Computing system 200 and intelligence module 212 and the methods and systems described herein will be further described in detail below in reference to additional figures.

Processor(s) 102,202 can be implemented by one or more programmable processors executing one or more computer programs to perform the functions of the method or system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in-one or more application specific integrated circuits (ASICs), microprocessors, digital signal processors, microcontrollers, field programmable gate arrays (FPGAs), programmable logic arrays (PLAs), multi-core processors, graphics processing units (GPUs), or general-purpose computers with associated memory. The "processor" can be analog, digital or mixed-signal. In some embodiments, the "processor" can be one or more physical processors or one or more "virtual" (e.g., remotely located or "cloud") processors. According to one embodiment, the methods and systems described herein are implemented by one or more general-purpose and/or special-purpose computing devices. The general-purpose and/or special-purpose computing devices may be hard-wired to perform the methods, or may include digital electronic devices such as one or more application-specific integrated circuits (ASICs), field programmable gate arrays (FPGAs), graphics processing units (GPUs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, GPUs, or NPUs with custom programming to accomplish the methods. The special-purpose computing devices may be desktop computer systems, portable computer systems, handheld devices, networking devices or any other device or system that incorporates hard-wired and/or program logic to implement the methods or techniques.

The terms "memory" or "data store" as used herein refers to any non-transitory media that store data, information and/or instructions that cause a machine to operate in a specific fashion. Such storage media may comprise non-volatile media and/or volatile media. Non-volatile media includes, for example, optical or magnetic disks, such as storage device. Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires. Transmission media can also take the form of acoustic or light waves, such as those generated during radio-wave, infra-red or wireless/cellular information/data communications.

Various forms of media may be involved in carrying one or more sequences of one or more instructions to processors 102, 202 for execution. For example, the instructions may initially be carried on a magnetic disk or solid state drive of a remote computer. Communications interfaces can include one or more interfaces to enable computer device or system 100, 200 to access a one or more computer networks such as a LAN, a WAN, or the Internet through a variety of wired and/or wireless or cellular connections. In described embodiments, a first computing device 100 can execute an application on behalf of a user of a client computing device, can execute a virtual machine, which provides an execution session within which applications execute on behalf of a user or a client computing device, such as a hosted desktop session, can execute a terminal services session to provide a hosted desktop environment, or can provide access to a computing environment including one or more of: one or more applications, one or more desktop applications, and one or more desktop sessions in which one or more applications can execute.

Turning now to FIGS. 3, 4 and 5, a hyperintelligence system and one or more networks and computing environment in or by which the methods and systems described herein are executed or deployed is illustrated, in accordance with some embodiments. It will be understood that identical reference numbers shown in FIGS. 1-5 indicate identical components. The components illustrated in FIGS. 1-5 may be implemented in software and/or hardware. Each component may be distributed over multiple applications, systems, devices and/or machines. Multiple components may be combined into one application, system, device and/or machine. Methods or operations described with respect to one component may instead be performed by another component. Some embodiments may be practiced without these specific details. Features described in one embodiment may be combined with features described in a different embodiment. In some examples, well-known structures and devices are described with reference to a block diagram in order to avoid unnecessarily obscuring the present invention.

Introduction to Hyperintelligence System

The hyperintelligence system 300 platform is an information processing and decision system/platform which provides fast decisions to interpret inputted information and make the best future decisions possible from real-time feedback and learning via artificial intelligence, machine learning, data science, statistics and other approaches.

Hyperintelligence System Lifecycle

To understand the method and systems executed in/by hyperintelligence system 300 an understanding of the overall lifecycle and a description of a few key concepts is helpful or may be necessary. Hyperintelligence system 300 makes use of, executes or employs one or more intelligence models (sometimes referred to as just models herein) to make/provide decision(s) or prediction(s) based on inputted information/data. A model must be built and deployed before it can be used to make a decision. A model may be rebuilt after feedback regarding a decision is provided. This enables the model to learn. As a result, three phases exist in the overall lifecycle: Build model(s), Execute model(s), and Collect Feedback for model(s) as illustrated in FIG. 17.

Each phase includes steps in its lifecycle which may or may not be executed concurrently. Building a model and executing a model are two separate phases of a model lifecycle. Each phase requires different information. Templates are declarative JSON (JavaScript Object Notation) files. There are two templates in the hyperintelligence system, model template and model type template. Each template is used to create a model or model type. A model type template stores the information relevant to a model type. A model template will reference a model type. A model template stores the information necessary to build and execute a model. During model build and model execution, steps may be skipped by providing a null value for the template property. This will provide flexible configuration and the ability to create models or rules that do not use all the steps in an artificial intelligence algorithm or other advanced data science methods. Throughout this document the terms model, algorithm or rule may refer to the same concept unless noted otherwise. A template may inherit from and override or extend one parent template. A JavaScript mixin for the parent and child JSON templates will be used to merge the two templates into one template. Templates may be versioned and deployed to one or more model storage repositories.

The build configuration of the model template is used during the model build phase of the hyperintelligence system lifecycle. The build configuration that is used at runtime during the model build phase may be overridden by specifying a ConfigurationService (see Configuration Service section) key with the naming convention <algorithm-name>.<version>.modelConfiguration or <algorithm-name>.latest.model and a value equal to a repository locator. This will enable the model builder to download this model template from the model storage repository. Model type templates are created and managed through the Administration Client Intelligence Module or the administration server intelligence module.

Model Type Template Properties

Model type template properties are detailed below:
name—Unique user-friendly model type name (combination of name, group, type and classifier must be unique). Prefixed with "predictor-", "rule-" or "profiler-". (Note: The predictor type examples for TYPO (is a trademark/servicemark of Quatro Consulting LLC) are predictor-duplicate and predictor-error). The profiler types are profiler-domain-detector-<domain-tag> or profiler-metric-<metric-name> (for example: profiler-domain-detector-email, profiler-domain-detector-address, profiler-domain-detector-firstname, profiler-metric-fuzzy-unique-count), (NOTE: profiler-metric models are typically not traditional data science models and are typically logic or calculations based on all or a portion of values in a column or set of columns.)
group—user-friendly group name
type—Optional—user-friendly type name
classifier—Optional—user-friendly classifier
version—Version of model type
result type—The result type is one of: binary-classification, multi-class-classification, multi-label-classification, probability (value in range of 0-1), or continuous. This result type is used by the Rapid Optimization (see Rapid Optimization section).
decision_logic_array—array of objects with runtime and logic properties. The runtime property is the runtime necessary to execute the Decision Logic. For example, python, c, c++, java, scala, spark, r, or javascript. The logic property is the logic or code that will be executed by the runtime. See Decision Logic section.

Model Template Properties

Model template properties are detailed below:
a name—user-friendly model name (combination of name, group, type and classifier must be unique)
group—user-friendly group name
type—Optional—user-friendly type name
classifier—Optional—user-friendly classifier
version—Version of model
model_type—Unique identifier to the type of model. Upon creation of a model template, if the model type does not exist, then the template creation or update will fail and an appropriate user-friendly message is provided.
result_metadata—Array of key value pairs containing additional result attributes like confidence_level, result_source (one of table-level-model, model, rapid-optimization), etc.
algorithm—Unique identifier to algorithm package including version (use Apache Maven convention)
tenant_id—Unique tenant identifier and publisher/maintainer of the template
runtime—This is the runtime necessary to run the model. One of python, c, c++, java, scala, spark, r, or javascript
executeRequires—Array of the required runtime dependencies to execute the model
buildRequires—Array of the required runtime dependencies to build the model
testRequires—Array of the required test dependencies for model testing
min_required_records—Minimum number of required records in the dataset to build the model
build_lifecycle_engine—The type of lifecycle engine for the build phase. Defaults to DAG engine.
build_logic—Array with logic for steps in the model build process that are called in an order determined by the build_lifecycle_engine. Each item includes a unique step name and the path to the function. Step names include:
run_before_build—Initialization function for the build process
validate_build_params—Validate build parameters in build_params property determine_training_resources—logic to determine the preferred node size and number for training. Logic includes determining the preferred node size and node number (specifies resource levels for number of CPUs, CPU speed, memory, disk space, IOPS, network speed, etc.). This logic will overwrite any default value provided in the build_params determine_test_resources—logic to determine the preferred node size and number for testing. Logic includes determining the preferred node size and node number (specifies resource levels for number of CPUs, CPU speed, memory, disk space, IOPS, network speed, etc.). This logic will overwrite any default value provided in the build_params determine_execute_resources—logic to determine the preferred node size and number for executing during data processing of data in motion or at rest. Logic includes determining the preferred node size and node number (specifies resource levels for number of CPUs, CPU speed, memory, disk space, IOPS, network speed, etc.). This logic will overwrite any default value provided in the execute_params. The results are added to execute_params property preprocess_data—Data Preprocessing Logic for build phase and may be used for execute phase if preprocess_data step not provided in the execute_logic property prepare_data—Training and test data creation logic. Verify dataset has row count greater than or equal to the value of ConfigurationService key minRowsForModelBuild.

select_features—Feature Selection Configuration for build and may be used for execute phase if select_features step not provided in the execute_logic property. Datasets have multiple columns and not all columns are relevant or needed for the algorithm to provide good error predictions. This is code to determine irrelevant dimensions and exclude from predictor and profiler model types.

train—Logic to train the model. Includes any algorithm parameter optimization. May add or change the execute_params property run_after_build—Cleanup and termination function for the build process.

build_params—Parameters that are made available to all functions in the execute_lifecycle_engine—The type of Lifecycle Engine for the execute phase. Defaults to DAG engine.

execute_logic—Array with logic for steps in the model build process that are called in an order determined by the execute_lifecycle_engine. Each item includes a unique step name and the path to the function. Note that the execute_lifecycle_engine may use logic from the build_logic property. When this occurs the execute_logic array is checked for a step name and if available the logic provided is used, otherwise the logic from the build_logic array is used. Step names include:

run_before_execute—Logic to run before execute phase starts validate_execute_params—Logic to validate execute_params property preprocess_data—Data Preprocessing Logic for execute phase select_features—Feature Selection Configuration for execute phase. Datasets have multiple columns and not all columns are relevant or needed for the algorithm to provide good error predictions. This is code to determine irrelevant dimensions and exclude from predictor and profiler model types.

execute—Runs the model and returns results run_after_execute—Logic to run last and directly before the execute phase ends execute_params—Parameters that are made available to all step in the execute_logic array Algorithm Packages Algorithm packages are built, versioned and deployed to a repository. Algorithm package is a zip containing:

Manifest file containing:
name—user-friendly name (combination of name, group, type and classifier must be unique)
group—user-friendly group name
type—Optional—user-friendly type name
classifier—This is the runtime necessary to run the algorithm. One of python, c, c++, java, scala, spark, r, or javascript
version—Version of an algorithm package
tenant_id—Unique tenant identifier and publisher/maintainer of the algorithm
type—one of weighted-average, predictor, rule, profiler-domain-detector, profiler-metric
result type—One of: binary-classification, multi-class-classification, multi-label-classification or continuous Algorithm or reference to algorithm
Function to determine if algorithm complies with dataset, data profile and feature selection configuration which are parameters to the function Model Packages During Model Build phase, built algorithms are downloaded from a repository based on package identifier. Data training and test selection logic is executed. Model is trained with selected data. Runtime Configuration is packaged with the built model. Then a versioned model is deployed to the Model Storage repository with the naming convention <algorithm-group>.<algorithm-name>.<modelType>.<datasetId>.<datasetTypeIdentifier>-<algorithm-version>-<major-version>.<minor-verison>.<patch-version>.<build-number>[-<runtime-calssifier>] (this is package identifier). Model package is a zip containing:

Manifest file containing:
name—user-friendly name (combination of name, group, type and classifier must be unique)
group—user-friendly group name
type—Optional—user-friendly type name
classifier—This is the runtime necessary to run the model. One of python, c, c++, java, scala, spark, r, or javascript
version—Version of an algorithm package
tenant_id—Unique tenant identifier and publisher/maintainer of the algorithm Model Configuration
Runtime Configuration At runtime, a worker will query the model storage with a package identifier for a version of the model and execute it.

Infrastructure Architecture

Hyperintelligence system 300 uses a microservices based architecture with containers and a container orchestration manager for automating deployment, scaling, and management of containerized applications. All services are individually scalable, maintainable and manageable. Services include but are not limited to:

Datastore Service—the main data store for the hyperintelligence computing system Hyperintelligence Administration System Data Store—
Data store used by the hyperintelligence administration system Usage Datastore Service—Data store used to hold usage information Blockchain Service—Blockchain used to store inputted information, intercepted data, processing date, dataset metadata and information, model information (version, inputs, etc.), results, decisions, any available feedback, any available user information, and source of data. Provides a permanent distributed ledger of the results and decisions made by hyperintelligence system.

Request Handler—Responsible for handling and delegating requests for the hyperintelligence computing system Queue—A queue that holds messages sent between two or more services or components. At least once delivery will be used to improve performance and throughput. Any message that is delivered twice (or in duplicate) to the same recipient should be ignored by the message recipient.

Worker—A worker reads messages from the queue. The messages contain information concerning what work to complete. A worker executes code based on the runtime it supports. See runtime property of the model template properties section.

Results Cache—A persistent cache holding temporary results and decisions

Model Test Handler—Responsible for handling and delegating test requests for the hyperintelligence computing system Model Storage Service—repository that provides storage for different versions and types of models, algorithms, packages and other artifacts Audit Request Handler—Responsible for handling and delegating audit (or scanning of data at rest) requests for the hyperintelligence computing system Configuration Endpoint—REST API that provides configuration information that is queried from the Hyperintelligence Administration System Data Store Build Worker—A worker reads messages from the queue. The messages contain information concerning what work to complete. A worker executes build code based on the runtime it supports. See runtime property of the model template properties section.

Deployment Configuration

Referring to FIG. 3, a block diagram of a hyperintelligence system 300 and one or more networks 318 and computing environment 304, in accordance with some embodiments, is depicted. Hyperintelligence system 300 can include one or more clients 306(1)-306(n) (also generally referred to as local machine(s) 306 or client device(s) 306) in communication with a hyperintelligence computing system 308, destination information system 310, proxy system 312, hyperintelligence administration system 314 and administrator computing system 316 via one or more networks 318. It will be appreciated that hyperintelligence system 300 is not limited to the use or need for any computing environment or network. Although the embodiment shown in FIG. 3 shows one or more networks 318, in other embodiments, hyperintelligence system 300 can be on the same network. The various networks 318 can be the same type of network or different types of networks. For example, in some embodiments, one or more networks 318 can be a private network such as a local area network (LAN) or a company Intranet, while one or more networks 318 and/or network 318 can be a public network, such as a wide area network (WAN) or the Internet. In other embodiments, network 318 can be private networks. Networks 318 can employ one or more types of physical networks and/or network topologies, such as wired and/or wireless networks, and can employ one or more communication transport protocols, such as transmission control protocol (TCP), internet protocol (IP), user datagram protocol (UDP) or other similar protocols.

As shown in FIG. 3, hyperintelligence system 300 may include one or more servers or operate in or as a server farm. Hyperintelligence computing system 308 includes one or more nodes 311(1)-311(n) or servers or server farm logically grouped, and can either be geographically co-located (e.g., on premises) or geographically dispersed (e.g., cloud based). In an embodiment, node(s) 311 executes methods to be described in further detail below. Hyperintelligence computing system 308 can accelerate communication with client device(s) 306 via one or more networks 318 using one or more techniques, such as: 1) transport layer connection pooling, 2) transport layer connection multiplexing, 3) transport control protocol buffering, 4) compression, 5) caching, or other techniques. Hyperintelligence computing system 308 can also provide load balancing and autoscaling of node(s) 311 to process requests from client device(s) 306 and/or Client Intelligence Module(s) 422 shown in FIG. 4. Proxy system 312 acts as a proxy or access server to provide access to the one or more nodes/servers, provide security and/or act as a firewall between a client device(s) 306 and other parts of hyperintelligence system 300.

Still referring to FIGS. 3, 4 and 5, hyperintelligence system 300 is shown having components in one deployment configuration according to the embodiments. Not all deployment configurations are shown, and it will be understood that there are many different configurations possible. FIGS. 3, 4 and 5 components are described in further detail as follows:

Client Device 306—origin or source system or device creating or providing data. Client Device 306 has a data store which may be the final destination of the data. Client device 306 may be numerous devices including but not limited to computers, tablets, mobile phones, virtual reality headsets, gaming consoles, cars, transportation equipment, manufacturing equipment, cameras, watches, human sensory devices, musical instruments, wearable devices, etc.;

Destination Information System 310—destination of the data provided by client device 306;

Hyperintelligence Computing System 308 is a cluster of one or more computing nodes or servers that processes the information or data and runs intelligence models to make a decision or prediction about the inputted information/data. Each node/server may have one or more processors, network interfaces, data stores, and memory;

Hyperintelligence Administration System 314—Provides a graphical user interface to perform administrative tasks and review hyperintelligence system 300 results, decisions, and state. The hyperintelligence administration system 314 interfaces with the hyperintelligence computing system 308;

Administrator Computing System 316—The system used by an administrative user

Client Intelligence Module 422—component that is provided inputted data from the client device and processes the data locally and remotely by interfacing with the hyperintelligence computing system 308 and/or other client intelligence modules 422;

Server Intelligence Module 424—Executable code residing on each server node in the hyperintelligence computing system 308 that processes data and requests concurrently;

Administration Server Intelligence Module 426—Executable code that provides a graphical user interface for performing administrative tasks on the hyperintelligence system 300; and Administration Client Intelligence Module 428—Executable code that provides an interface like a command line interface (CLI) for performing administrative tasks on the hyperintelligence system 300.

All Components

FIG. 6 illustrates possible different components and configuration combinations. It will be understood that identical reference numbers shown in FIGS. 3, 4 and 5 indicate identical components in FIG. 6. This figure is not intended to show a specific deployment configuration. A multitude of deployment configurations are possible. This figure illustrates different configurations wherein the client intelligence module may be on/in the client device, the client intelligence modules may be on/in the proxy system or wherein a proxy system having no intelligence modules forwards information to the hyperintelligence computing system 308 or the wherein the client module does not have any intelligence module but the destination system does have an client intelligence module.

Sequence Diagrams

Referring now to FIGS. 7-12, sequence diagrams are shown to illustrate the methods executed in or by a hyperintelligence system and one or more networks and computing environment, in accordance with some embodiments. It will be understood that identical reference numbers shown in FIGS. 3-6 indicate identical components in FIGS. 7-12. These sequence diagrams are shown in the context of various deployment configurations as set forth and described in connections with FIGS. 1-6. While FIGS. 7-12 are shown as Object Management Group, Inc. Unified Modeling Language (UML) sequence diagrams (see https://www.uml.org/), it will be appreciated that alternative sequence, state diagrams or flowcharts could be used to illustrate the methods and systems in accordance with the embodiments.

Client Intelligence Module on Client Device

FIG. 7 illustrates a sequence/state diagram in which the client intelligence module 422 is in/on the client device 306. FIG. 7 depicts two scenarios: 1) wherein client device 306 is notified and 2) wherein client device 306 is not notified. The sequence for wherein client device 306 is notified is shown on the top half above the dotted line with each arrow from top to bottom as follows:

1. User of one or more source system input/output device(s) submits data to client device;
2. Client device client intelligence module runs local models;
3. Client device client intelligence module sends data to hyperintelligence computing system;
4. Hyperintelligence computing system runs appropriate models concurrently on nodes and returns results and decisions to client device client intelligence module;
5. Client device client intelligence module calculates final results and decisions and sends final results and decisions to hyperintelligence computing system;
6. In this scenario the final decisions predict an error, so client device displays prediction to user;
7. User provides feedback about the prediction to client device;
8. Client device sends feedback to hyperintelligence computing system. In this scenario the feedback confirms the prediction is correct. Alternate path: If feedback confirms the prediction is incorrect then an additional step would be appended after this step wherein client device client intelligence module sends the data to the destination computing system. (This scenario is provided below); and
9. Hyperintelligence computing system learns by rebuilding and distributing models (NOTE: Based on configuration this may require communication with destination computing system data store).

Still referring to FIG. 7, the sequence for wherein client device 306 is not notified is shown on the bottom half below the dotted line with each arrow from top to bottom as follows:

1. User of one or more source system input/output device(s) submits data to client device;
2. Client device client intelligence module runs local models;
3. Client device client intelligence module sends data to hyperintelligence computing system;
4. Hyperintelligence computing system runs appropriate models concurrently on nodes and returns results and decisions to client device client intelligence module;
5. Client device client intelligence module calculates final results and decisions and sends final results and decisions to hyperintelligence computing system;
6. Hyperintelligence computing system learns by rebuilding and distributing models (NOTE: Based on configuration this may require communication with destination computing system data store);
7. In this scenario the final decisions predict not error, so prediction is not displayed to user. Instead client device client intelligence module sends the data to the destination computing system;
8. Destination computing system sends response to client device; and
9. Client device displays response on output device for user.

FIG. 8 illustrates a sequence/state diagram in which the client intelligence module 422 is in/on the proxy system 312. FIG. 8 again depicts two scenarios: 1) wherein client device 306 is notified and 2) wherein client device 306 is not notified. The sequence for wherein client device 306 is notified is shown on the top half above the dotted line with each arrow from top to bottom as follows:

1. User of one or more source system input/output device(s) submits data to client device;
2. Client device sends data to proxy system (where final destination of data is the destination computing system);
3. Proxy system client intelligence module runs local models;
4. Proxy system client intelligence module sends data to hyperintelligence computing system;
5. Hyperintelligence computing system runs appropriate models concurrently on nodes and returns results and decisions to proxy system client intelligence module;
6. Proxy system client intelligence module calculates final results and decisions and sends final results and decisions to hyperintelligence computing system;
7. In this scenario the final decisions predict an error, so proxy system client intelligence module sends the prediction to the client device;
8. Client device displays prediction to user via output device;

9. User provides feedback about the prediction;
10. Client device sends feedback to proxy system client intelligence module;
11. Proxy system client intelligence module sends feedback to hyperintelligence computing system. In this scenario the feedback confirms the prediction is correct. Alternate path: If feedback confirms the prediction is incorrect then an additional step would be appended after this step wherein proxy system client intelligence module sends the data to the destination computing system. (This scenario is described in further detail below); and
12. Hyperintelligence computing system learns by rebuilding and distributing models (NOTE: Based on configuration this may require communication with destination computing system data store).

Still referring to FIG. 8, the sequence for wherein client device 306 is not notified is shown on the bottom half below the dotted line with each arrow from top to bottom as follows:
1. User of one or more source system input/output device(s) submits data to client device;
2. Client device sends data to proxy system (where final destination of data is the destination computing system);
3. Proxy system client intelligence module runs local models;
4. Proxy system client intelligence module sends data to hyperintelligence computing system;
5. Hyperintelligence computing system runs appropriate models concurrently on nodes and returns results and decisions to proxy system client intelligence module;
6. Proxy system client intelligence module calculates final results and decisions and sends final results and decisions to hyperintelligence computing system;
7. Hyperintelligence computing system learns by rebuilding and distributing models (NOTE: Based on configuration this may require communication with destination computing system data store);
8. In this scenario the final decisions predict not error, so prediction is not displayed to user. Instead, proxy system client intelligence module sends the data to the destination computing system;
9. Destination computing system sends response to client device (Note: Some network configuration may require the response to go through the proxy system); and
10. Client device displays response on output device for user.

Proxy System Forwards to Hyperintelligence Computing System

FIG. 9 illustrates a sequence/state diagram in which client intelligence module 422 is not used but instead proxy system 312 forwards inputted information/information to hyperintelligence computing system 308. Again FIG. 9 depicts two scenarios: 1) wherein client device 306 is notified and 2) wherein client device 306 is not notified. The sequence for wherein client device 306 is notified is shown on the top half above the dotted line with each arrow from top to bottom as follows:
1. User of one or more source system input/output device(s) submits data to client device;
2. Client device sends data to proxy system (where final destination of data is the destination computing system);
3. Proxy system sends data to hyperintelligence computing system;
4. Hyperintelligence computing system runs appropriate models concurrently on nodes and calculates final results and decisions. In this scenario the final decisions predict an error, so prediction response is sent to client device (Note: Some network configurations may require the response to go through the proxy system);
5. Client device displays prediction to user with output device;
6. User provides feedback about the prediction;
7. Client device sends feedback to proxy system;
8. Proxy system sends feedback to hyperintelligence computing system. In this scenario the feedback confirms the prediction is correct. Alternate path: If feedback confirms the prediction is incorrect then an additional step would be appended after this step wherein hyperintelligence computing system sends the data to the destination computing system. (This scenario is described in detail below); and
9. Hyperintelligence computing system learns by rebuilding and distributing models (NOTE: Based on configuration this may require communication with destination computing system data store).

Still referring to FIG. 9, the sequence for wherein client device 306 is not notified is shown on the bottom half below the dotted line with each arrow from top to bottom as follows:
1. User of one or more source system input/output device(s) submits data to client device;
2. Client device sends data to proxy system (where final destination of data is the destination computing system);
3. Proxy system sends data to hyperintelligence computing system;
4. Hyperintelligence computing system runs appropriate models concurrently on nodes and calculates final results and decisions. In this scenario the final decisions predict not error, so no prediction response is sent to client device. Hyperintelligence computing system learns by rebuilding and distributing models (NOTE: Based on configuration this may require communication with destination computing system data store);
5. Hyperintelligence computing system sends data to destination computing system;
6. Destination computing system sends response to client device (Note: Some network configuration may require the response to go through the proxy system); and
7. Client device displays response on output device for user.

Client Intelligence Module on Destination Computing System

FIG. 10 Illustrates a sequence/state diagram in which client intelligence module 422 is in/on the destination computing system 310. Once again FIG. 10 depicts two scenarios: 1) wherein client device 306 is notified and 2) wherein client device 306 is not notified. The sequence for wherein Client Device 306 is notified is shown on the top half above the dotted line with each arrow from top to bottom as follows:
1. User of one or more source system input/output device(s) submits data to client device;
2. Client device sends data to destination computing system;
3. Destination computing system client intelligence module runs local models;
4. Destination computing system client intelligence module sends data to hyperintelligence computing system;

5. Hyperintelligence computing system runs appropriate models concurrently on nodes and returns results and decisions to destination computing system client intelligence module;
6. Destination computing system client intelligence module calculates final results and decisions and sends final results and decisions to hyperintelligence computing system;
7. In this scenario the final decisions predict an error, so destination computing system client intelligence module sends the prediction to the client device;
8. Client device displays prediction to user via output device;
9. User provides feedback about the prediction;
10. Client device sends feedback to destination computing system client intelligence module;
11. Destination computing system client intelligence module sends feedback to hyperintelligence computing system. In this scenario the feedback confirms the prediction is correct. Alternate path: If feedback confirms the prediction is incorrect then an additional step would be appended after this step wherein destination computing system continues processing the data. (This scenario is described in detail below); and
12. Hyperintelligence computing system learns by rebuilding and distributing models (NOTE: Based on configuration this may require communication with destination computing system data store).

Still referring to FIG. 10, the sequence for wherein client device 306 is not notified is shown on the bottom half below the dotted line with each arrow from top to bottom as follows:

1. User of one or more source system input/output device(s) submits data to client device;
2. Client device sends data to destination computing system;
3. Destination computing system client intelligence module runs local models;
4. Destination computing system client intelligence module sends data to hyperintelligence computing system;
5. Hyperintelligence computing system runs appropriate models concurrently on nodes and returns results and decisions to destination computing system client intelligence module;
6. Destination computing system client intelligence module calculates final results and decisions and sends final results and decisions to hyperintelligence computing system;
7. Hyperintelligence computing system learns by rebuilding and distributing models (NOTE: Based on configuration this may require communication with destination computing system data store);
8. In this scenario the final decisions predict not error, so prediction is not displayed to user. Instead destination computing system client intelligence module allows destination computing system to continue processing the data;
9. Destination computing system sends response to client device; and
10. Client device displays response on output device for user.

Feedback from User of Administration System & Real-Time Learning

FIG. 11 illustrates a sequence/state diagram in feedback from a user of administrator computing system 316 and real-time learning is executed as follows:

1. User of administrator computing system provides feedback on a prediction to the hyperintelligence administration system;
2. Hyperintelligence administration system sends feedback to hyperintelligence computing system; and
3. Hyperintelligence computing system learns by rebuilding and distributing models (NOTE: Based on configuration this may require communication with destination computing system data store).

Client Intelligence Module on Client Device

Referring now to FIG. 12, hyperintelligence system 300 ecommerce application/use case will be described. FIG. 12 illustrates a sequence/state diagram in which client intelligence module 422 is in/on client device 306 wherein client device 306 is notified as follows:

1. User of one or more source system input/output device(s) submits addition of item in ecommerce shopping cart to client device;
2. Client device client intelligence sends addition of item in ecommerce shopping cart to destination computing system;
3. Client device client intelligence module runs local models;
4. Client device client intelligence module sends data to hyperintelligence computing system;
5. Hyperintelligence computing system runs appropriate models concurrently on nodes and returns results and decisions to client device client intelligence module;
6. Client device client intelligence module calculates final results and decisions and sends final results and decisions to hyperintelligence computing system;
7. In this scenario the final decisions predict user may also like two more items, so client device displays prediction to user;
8. User provides feedback about the prediction to client device by adding the two items to the ecommerce shopping cart;
9. Client device client intelligence module sends feedback to hyperintelligence computing system. In this scenario the user feedback confirms the prediction is correct since user added both items to shopping cart;
10. Hyperintelligence computing system learns by rebuilding and distributing models (NOTE: Based on configuration this may require communication with destination computing system data store); and
11. Client device client intelligence module sends addition of two items in shopping cart to the destination computing system.

Intelligence Model(s) Learning & Optimization

Models are trained with data (called training data). This training allows the model to learn and then make sound decisions/predictions (or the best decisions/predictions that the model algorithm can). During the collect feedback phase of the hyperintelligence lifecycle, model performance is tracked by user responses during data in motion inspection and responses from administrators while using the administration server intelligence module to review and provide feedback in the form of labels for hyperintelligence system results. The former responses are called user labels and the latter are called admin labels. Users can be systems or non-human. Labels are feedback about hyperintelligence system results and decisioris. When labels are used with training data, this data is referred to as labeled training data. Labels can be provided for all four possibilities of a decision (false negative, false positive, true negative, true positive) but the number of admin labels is expected to be very low because this is a tedious task. It is human nature to identify a wrong result and not confirm a correct result. In the case of false labels, an administrator or user can provide other labels and feedback like the correct value or decision. The goal of learning & optimization is to decrease false positives and negatives while increasing true positives and negatives.

In the case of TYPO (IS A TRADEMARK/SERVICEMARK OF QUATRO CONSULTING LLC), user labels do not provide false negatives because when model predicts that a row is error free then there is no reason to burden the user and inform the user of the decision. User labels only provide false positives. Admin labels provide all four possibilities.

The following assumptions are made to simplify optimization approaches outlined below. Data requirements change overtime; therefore, more recent labels are more accurate than older labels more recent training data will lead to better prediction accuracy than older training data. Neural Networks and genetic algorithms can be used to optimize inputs for a known output, but the first optimization implementations will be simple. The advantage is minimal resource (processors, memory, etc.) usage to enable fastest inclusion of feedback for future model executions.

Rapid Optimization

Rapid Optimization (also known as Label History Check) is the process of enabling a model to learn from feedback (labels) without the need to rebuild (and retrain) the model. This is achieved by using Label History and checking recent labels prior to executing a model. If a label exists that substantially matches the current row being processed, then the appropriate decision and/or results for the label is returned. Otherwise, execute the model. Label data includes the entire row of data to which a label applies. Labels can be for one cell, a set of cells or the entire row. The aforementioned are the three label levels. The same cell, cell set, or row could be used in multiple labels. Labels that exceed a label expiration time will not be included in Rapid Optimization. Default Label Selection Logic (see Default Label Selection Logic section below) includes logic used to match a row under processing to a previous row that has labels. The default logic compares the value of every column except any unique key columns in the row under processing to each row with labels. Since this matching logic is expected to be the most commonly used matching logic, upon the creation of labels, a hash (called the Default Row Hash) will be created and saved to the Datastore Service and/or cache. During interception of data in motion or scanning of data at rest, a Default Row Hash for the row under processing will be created and saved to the Datastore Service (and/or cache) if it does not already exist in the case of scanning data at rest. Then Default Row Hash for the row under processing is compared to existing Default Row Hashes of rows with labels. There are two levels of Rapid Optimization. The first is row level which is executed first and only uses row level labels. The second is model level which uses cell and cell set labels. If the row level Rapid Optimization returns a decision, then there is no need to execute the model level Rapid Optimization which returns a result. The distinction between a decision and result is important. Users see and respond to decisions with feedback. A result is the output from running a model. One or more model results of the same model type are used to calculate a final result for the model type. Then the final result is used to make a decision. The hyperintelligence system must save each model result, the final result, and the decision. In many cases the final result and the decision will be the same. Cases where they are different must be considered and supported. The hyperintelligence system must support a decision plan which defines workflow that is controlled by the results of models, the final result and/or decision. In a decision plan the results of models, the final results and/or decisions are used to choose the next set of models to execute. The workflow continues until a terminating decision is reached. The results of models, the final results and/or decisions must be used as input for the next set of models and/or behavior in the workflow.

Consider the case of TYPO (IS A TRADEMARK/SERVICEMARK OF QUATRO CONSULTING LLC), where the result type (see Model Type Template Properties section) of predictor-error model type is probability. Therefore, the models return a result in the range of 0-1. Then the final result is computed with a weighted averaging algorithm with all model results as input to the algorithm. The final result is compared to a threshold to decide if the input data to the model is an error or not an error. When performing row level Rapid Optimization, the decision is returned. Attempting to return the final result from the label and then performing the current decision logic is a flawed approach because the current decision logic might be different from the decision logic that was used at the time the labeled row was processed. For model level Rapid Optimization, a result needs to be returned because the weighted averaging is necessary to reach a final decision. For all result types, the final result produced from weighted averaging is assumed by the Default Rapid Optimization Logic to be the decision.

Rapid Optimization Logic is customizable by a platform user and by model type. In the case of TYPO (IS A TRADEMARK/SERVICEMARK OF QUATRO CONSULTING LLC) customization is needed. A modified result is returned from model level Rapid Optimization. The result type is probability and the result is modified because a label has removed all uncertainty about the input data. There is no probability to consider because the label has provided the result. So, the result returned by the model level Rapid Optimization should be either 0 or 1.

The steps for the default Rapid Optimization Logic are:
1. Run Label Selection Logic—see Default Label Selection Logic section; and
2. Run Result Generation Logic—this determines the result based on all the labels that matched. See Default Result Generation Logic.

Model Optimization

Model Optimization includes changes to Model Configuration via changes to Model Template such as:
1. Training Data—which data is selected including labels (see Default Label Selection Logic). The data selected for training will typically change due to the addition or change of data in the dataset. The addition or change can be the same data that was intercepted. The addition or change may be made to a customer database. This will typically cause the data selected for training to change. The Model Template Properties determine what data is selected;
2. Build Configuration—changes to input parameters to the training functions of the algorithm and/or changes to build_params and build_logic Model Template properties; and
3. Runtime Configuration—changes to input parameters to execute the model.

Weight Optimization

Weight Optimization is changes to model weights (Model Level) or changes to how the final decision (or result) is calculated from multiple models (Aggregate Level). See Weighted Averaging Algorithm section for details about creating a final decision.

Default Label Selection Logic

The default queries for labeled data which is used by Rapid Optimization and Model Optimization are outlined in this section. It is common for a dataset to have multiple audits (or point in time scans of data at rest) with labels in each audit. Therefore, it is possible for the same row in the dataset to have conflicting labels (at the row, column or column set level) in multiple audits. It is possible for the same row in a dataset to have labels for different result types from different model types.

The Default Label Selection Logic
1. Query for labeled data for the matching rows where Default Row Hash of row under processing equals the Default Row Hash saved in the Datastore Service (and/or cache) and (current date in milliseconds—update date of label in milliseconds)<value of ConfigurationService key labelExpirationMillis. Then sort by update date in descending order. Note: Since data requirements change over time, this will allow current data requirements to apply in models.
2. Create an empty Map (like java.util.Map interface) for model types called modelTypeLabelMap. Note: Other Maps, Label Maps, will be created for each model type. The Label Map will hold the selected labels for a specific model type. Then the Label Map is used as a value entry in the modelTypeLabelMap.
3. For each label record in query results:
   a. Create a Map keys based on the level of the label and the model type. Key for the modelTypeLabelMap will be the model type (see type attribute of the Model Template Properties section). The key for the Label Map will be column name for column level, set of column names appended in alphabetical order with delimiter of "%" for column set level, or "row" for row level label. Check if key for modelTypeLabelMap exists in modelTypeLabelMap.
      i. If no, then create new Label Map. Add entry with label (which includes all data in row and the results of all model decisions for this row with key, for Label Map that was created in Step a. above, to the Label Map. Add the Label Map to the modelTypeLabelMap with the appropriate key for the model type that was created in Step a. above. Continue to next label record.
      ii. Otherwise, use key for modelTypeLabelMap, that was created in Step a. above, to retrieve Label Map from modelTypeLabelMap. Check if key for Label Map, that was created in Step a. above, exists in Label Map. If no, add label (which includes all data in row and the results of all model decisions for this row) with key to the Label Map. (Note: This Logic assumes a runtime of java and the Label Map is modified by a reference or pointer which does not require the Label Map entry in the modelTypeLabelMap to be overwritten or updated separately. Other programming languages and runtimes may require the Label Map entry in the modelTypeLabelMap to be overwritten or updated separately.)

For performance enhancement, the Maps may be stored in a cache for faster lookup. Cache will be updated as soon as possible when labels are added, edited or deleted.

Decisions made by the hyperintelligence system may require multiple models of different result types (see type property in Model Template Properties section). A decision may be a binary classification or a predicted continuous value like the temperature tomorrow. Labeled data may or may not include feedback which provides the correct decision. Labeled data may only provide feedback that the decision was accurate or inaccurate. When a label only provides feedback that a decision is inaccurate and no other feedback, then the best that the Default Result Generation Logic can provide is a result that says "not X" where X is the inaccurate decision. In the case where the decision is a binary classification, then result can be determined. Since it is "not X" then is must be the other classifier.

The Default Result Generation Logic
1. Check parameters to determine if the Rapid Optimization is Row Level Rapid Optimization. If no, then continue to step 2 below. If yes, then query modelTypeLabelMap created by Label Selection Logic with a key equal to the model type parameter. If Label Map not found, return null. Note: Parameters to Rapid Optimization include level of rapid optimization, model type and set of one or more column names.
   a. Query Label Map with key "row". If label not found, then return null and end processing.
   b. Otherwise,
      i. If label indicates an accurate decision, then return the decision from the label data.
      ii. Else if the label indicates an inaccurate decision and a correction is available, then return the correction.
      iii. Else if the label indicates an inaccurate decision and model type is equal to binary-classification, then return the other decision (not the inaccurate decision) classifier. Other decision classifier can be found by querying the model type object from the Datastore Service or cache.
      iv. Else return null.
2. Otherwise, perform model level Rapid Optimization result generation
   a. Query modelTypeLabelMap created by Label Selection Logic with a key equal to the model type parameter. If Label Map not found, then return null. Note: Parameters to Rapid Optimization include level of rapid optimization, model type and set of one or more column names.
   b. Create Label Map key from Rapid Optimization parameters by alphabetically sorting set of column names and then appending each column name in alphabetical order with a delimiter of "%". Key should not have the delimiter at the end. "%/" may be at the end of the key if the last column name ends with "%".
   c. Query Label Map with key. If no label found, then return null. Otherwise,
      i. If label indicates an accurate result, then return the result from the label data.
      ii. Else if the label indicates an inaccurate result and a correction is available, then return the correction.
      iii. Else if the label indicates an inaccurate result and model type is equal to binary-classification, then return the other result (not the inaccurate decision) classification. The other result classification can be found by querying the model type object from the Datastore Service or cache.
      iv. Else return null.

Weighted Averaging Algorithm

Weighted Averaging Algorithm (WAA) packages are built, versioned and deployed to a repository as an algorithm package. WAAs are customizable by platform users.

Default Weighted Averaging Algorithm for Binary Classification and Multi-Class Classification Return Types Below is the default weighted averaging algorithm for binary-classification and multi-class-classification return types in Java pseudo code. Other code implementations may achieve the same or similar behavior.

Assumes set of n items of the same Model Type and return_type (see Model Type Template Properties section). Each item has model unique identifier (modelId), model result ($r_n$) and model weight ($w_n$), where $0<=w_n<=1$ and where $r_n$ is one of multiple possible values. For binary-classification return types, $r_n$ is one of two possible values. For multi-class-classification return types, $r_n$ is one of three or more possible values.

```
import java.util.*;
Map<String, Collection<Double>> weightedVoteMap = new HashMap<String,
Collection<Double>>( );
double defaultMinWeight = Double.parseDouble(ConfigurationService.get("defaultMinWeight",
"0", tenantId, repositoryName, datasetName));
for (int i = 0; i < items.length; i++) {
   double defaultMinWeightModel = ConfigurationService.get("defaultMinWeight." +
items[i].modelId, defaultMinWeight, tenantId, repositoryName, datasetName);
     if (defaultMinWeightModel <= items[i].weight) {
        Collection<Double> weights = weightedVoteMap.get(items[i].result);
        if (weights == null) {
           weights = new ArrayList<Double>( );
           weightedVoteMap.put(items[i].result, weights);
        }
        weights.add((Double) items[i].weight);
     }
}
Double highestAverage = null;
String selectedClass = null;
Iterator entrySetIterator = weightedVoteMap.entrySet( ).iterator( );
while (entrySetIterator.hasNext( )) {
   Map.Entry pair = (Map.Entry) entrySetIterator.next( );
   // average the weights for each class then find highest average
   Collection<Double> weights = (Collection<Double>) pair.getValue( );
   Iterator weightsIterator = weights.iterator( );
   double weightSum = 0;
   int counter = 0
   while (weightsIterator.hasNext( ) {
      weightSum += ((Double) weightsIterator.next( )).doubleValue( );
      counter++;
   }
   double average = (counter != 0 ? weightSum/counter : 0);
   if (highestAverage == null || highestAverage.doubleValue( ) < average) {
      // note in case of tie for highest average the first class
// set is the class returned
       highestAverage = new Double(average);
       selectedClass = (String) pair.getKey( );
   }
}
return selectedClass;
```

Default Weighted Averaging Algorithm for Multi-Label Classification Return Types Below is the default weighted averaging algorithm for multi-label-classification return types in Java pseudo code. Other code implementations may achieve the same or similar behavior.

Assumes set of n items of the same Model Type and return_type (see Model Type Template Properties section). Each item has model unique identifier (modelId), model result ($r_n$) and model weight ($w_n$), where $0<=w_n<=1$ and where $r_n$ is an array of one or more of multiple possible values.

```
import java.util.*;
Map<String, Collection<Double>> weightedVoteMap = new HashMap<String,
Collection<Double>>( );
double defaultMinWeight = Double.parseDouble(ConfigurationService.get("defaultMinWeight",
"0", tenantId, repositoryName, datasetName));
for (int i = 0; i < items.length; i++) {
   double defaultMinWeightModel = ConfigurationService.get("defaultMinWeight." +
items[i].modelId, defaultMinWeight, tenantId, repositoryName, datasetName);
```

```
   if (defaultMinWeightModel <= items[i].weight) {
      for (int j = 0; i < items[i].result.length; j++) {
         Collection<Double> weights = weightedVoteMap.get(items[i].result[j]);
         if (weights == null) {
            weights = new ArrayList<Double>( );
            weightedVoteMap.put(items[i].result[j], weights);
         }
         weights.add((Double) items[i].weight);
      }
   }
}
double defaultMultiLabelDiscriminationThreshold =
Double.parseDouble(ConfigurationService.get("defaultMultiLabelDiscriminationThreshold ",
"0.5", tenantId, repositoryName, datasetName));
Collection<String> classes = new ArrayList<String>( );
Iterator entrySetIterator = weightedVoteMap.entrySet( ).iterator( );
while (entrySetIterator.hasNext( )) {
   Map.Entry pair = (Map.Entry) entrySetIterator.next( );
   // average the weights for each class then compare average to threshold
   Collection<Double> weights = (Collection<Double>) pair.getValue( );
   Iterator weightsIterator = weights.iterator( );
   double weightSum = 0;
   int counter = 0
   while (weightsIterator.hasNext( ) {
      weightSum += ((Double) weightsIterator.next( )).doubleValue( );
      counter++;
   }
   double average = (counter != 0 ? weightSum/counter : 0);
   if (defaultMultiLabelDiscriminationThreshold <= average) {
      classes.add((String) pair.getKey( ));
   }
}
return classes;
```

Default Weighted Averaging Algorithm for Probability and Continuous Return Types Below is the default weighted averaging algorithm for probability and continuous return types in Java pseudo code. Other code implementations may achieve the same or similar behavior.

Assumes set of n items of the same Model Type and return_type (see Model Type Template Properties section). Each item has model unique identifier (modelId), model result ($r_n$) and model weight ($w_n$), where $0<=w_n<=1$ and where, for probability return types, $0<=r_n<=1$.

```
double resultProductSum = 0;
int counter = 0;
double defaultMinWeight =
Double.parseDouble(ConfigurationService.get("defaultMinWeight",
"0", tenantId, repositoryName, datasetName));
for (int i = 0; i < items.length; i++) {
   double defaultMinWeightModel =
Double.parseDouble(ConfigurationService.get("defaultMinWeight." +
items[i].modelId, defaultMinWeight, tenantId, repositoryName,
datasetName));
   if (defaultMinWeightModel <= items[i].weight) {
      counter++;
      resultProductSum += (items[i].weight * items[i].result);
   }
}
return (counter != 0 ? resultProductSum/counter : 0);
```

Directed Acyclic Graphs

The directed acyclic graphs (DAGs) detailed in this section show stages that must be completed before starting the next stage. Stages at the same indention (or hierarchy) will run concurrently. Details of stages are provided in subsections matching the stage name under the Model Build Lifecycle for Dataset section.

Execute Predictor Model for Data at Rest DAG has steps that are detailed in Scanning of Data at Rest section below.

Execute Predictor Model for Data in Motion DAG has steps that are detailed in Real-time Interception of Data in Motion section below.

The Build phase of the lifecycle is composed of two DAGs, Prepare Model Build DAG and either Build Predictor Model DAG or Build Profiler Model DAG. Upon completion of the Build phase, models are built and available in the Model Storage Service for use during the Execute phase. A Profiler Model is a model that provides one or more data profile metrics as output. A Predictor Model is a model that is directly used to make decisions. Metrics are included in the Data Profile which are used by Predictor Models. In addition to the default set of metrics discussed below, custom metrics can be created by a user. A Profiler Model enables a user to add custom metrics to the Data Profile. Custom metrics (including calculation algorithm) created by user. Custom Profiler Model package is versioned and deployable to the Model Storage Service. Profiler Model is executed by Workers like Predictor Model execution.

The hyperintelligence system will provide these default Data Profile metrics:

1. Normality metrics—provided from a Shapiro-Wilk test on all dataset types. Shapiro-Wilk test is detailed in "An analysis of variance test for normality (complete samples)" by Shapiro, S. S.; Wilk, M. B. and published in 1965.
2. Correlation coefficients matrix—created by computing the Pearson correlation coefficient (https://en.wikipedia.org/wiki/Pearson_correlation_coefficient) for each possible numeric pair of columns in the dataset.
   a. Compute the correlation matrix for each dataset type
   b. Mark the pairs of columns that are correlated based on a configured correlation minimum threshold (default of 0.98)
3. Deep Feature Synthesis—Create the metrics detailed below by running Deep Feature Synthesis, as described in "Deep Feature Synthesis: Towards Automating Data Science Endeavors" by James Max Kanter and Kalyan Veeramachaneni, for each dataset type.
  a. Minimum value of each numeric column
  b. Maximum value of each numeric column
  c. Average value of each numeric column
For detailed steps in the Execute Profiler Model DAG see Data Profile subsection of the Prepare Model Build subsection in the Model Build Lifecycle for Dataset section.

Prepare Model Build DAG

Refer now to the flow chart in FIG. 18 for the Prepare Model Build DAG.

Stages:
  a Infer Schema (see Schema Inference subsection of the Prepare Model Build subsection in the Model Build Lifecycle for Dataset section)
    Create Relationship Configuration (see Relationship Configuration subsection of the Prepare Model Build subsection in the Model Build Lifecycle for Dataset section)
      Run Domain Detectors for Regular Dataset (see Data Domain Detection subsection of the Prepare Model Build subsection in the Model Build Lifecycle for Dataset section)
    Create Data Subset Configuration (see Data Subset Configuration subsection of the Prepare Model Build subsection in the Model Build Lifecycle for Dataset section)
      Run Domain Detectors for Regular Dataset (see Data Domain Detection subsection of the Prepare Model Build subsection in the Model Build Lifecycle for Dataset section)
      Create Data Profile for Data Subset (see Data Profile subsection of the Prepare Model Build subsection in the Model Build Lifecycle for Dataset section)
    Create Join Configuration (optional) (see Join Configuration subsection of the Prepare Model Build subsection in the Model Build Lifecycle for Dataset section)
      Run Domain Detectors for Joined Dataset (see Data Domain Detection subsection of the Prepare Model Build subsection in the Model Build Lifecycle for Dataset section)
      Create Data Profile for Joined Dataset (see Data Profile subsection of the Prepare Model Build subsection in the Model Build Lifecycle for Dataset section)
    Create Data Profile for Regular Dataset (see Data Profile subsection of the Prepare Model Build subsection in the Model Build Lifecycle for Dataset section)

Build Predictor Model DAG

Refer now to the flow chart in FIG. 19.

Stages:
  Prepare Model Build DAG
    Process Algorithm Selection Configuration (see Process Algorithm Selection Configuration subsection of the Build Predictor Models subsection in the Model Build Lifecycle for Dataset section)
    Steps 3-6 in Build Predictor Models subsection of Model Build Lifecycle for Dataset section Build Profiler Model DAG Refer now to the flow chart in FIG. 20.

Stages:
  Prepare Model Build DAG
    Process Algorithm Selection Configuration (see Process Algorithm Selection Configuration subsection of the Build Profiler Models subsection in the Model Build Lifecycle for Dataset section)
    Steps 3-6 in Build Profiler Models subsection of Model Build Lifecycle for Dataset section Decision Logic Decision Logic is used to provide a final decision from multiple model results of the same model type. Input to Decision Logic is the final result of the weighted average algorithm and results of all models executed with a model type that matches the model type for this Decision Logic. Decision Logic provides model output as a decision. Decision Logic is included in the Model Type package (see Template & Configurations section). Decision Logic is written in different programming languages to support different runtimes. The Intelligence Module will choose the Decision Logic to execute based on the runtime of the Intelligence Module. Decision Logic is customizable by a customer or user.

The result type property of the Model Type Template determines the return value that should be returned. Default Decision Logic varies based on return type. Below is a summary of return types and the expected return values:

| Return Type | Return Value | Default Decision Logic Return Value |
| --- | --- | --- |
| binary-classification | One of two classes | Class with the highest weighted average score from individual classifiers (the models with return_type of binary-classification) |
| multi-class-classification | One of many classes | Class with the highest weighted average score from individual classifiers (the models with return_type of multi-class-classification) |
| multi-label-classification | One or more of many classes | List of classes. List is created with a voting scheme where every class from individual classifiers (the models with return_type of multi-label-classification) that receives a weighted average percentage of votes greater than the value of ConfigurationService key defaultMultiLabelDiscriminationThreshold is added to the list of classes returned. |
| probability | Range of 0-1 | Weighted average probability of all model probabilities |
| continuous | No restrictions. Any value | Weighted average of all model results |

In the case of TYPO (is a trademark/servicemark of Quatro Consulting LLC), the return type is probability and the decision is either error or not error. The TYPO (is a trademark/servicemark of Quatro Consulting LLC) decision is made by comparing the final result of the weighted average algorithm to a threshold probability value which was queried from the ConfigurationService. If the final result is greater than the threshold, then the decision is error. Otherwise, the decision is not error (also known as ok).

Data Preprocessing Logic

Structured information is comprised of clearly defined data types whose pattern makes them easily searchable. Relational database management systems store structured information. Unstructured information is comprised of data that is usually not as easily searchable, including formats like audio, video, and free form text. Data Preprocessing Logic is logic that is provided by a user to preprocess the data prior to sending it through further processing, analysis and use in models. Processing unstructured data into structured data that can be easily used by the hyperintelligence system is a common use for Data Preprocessing Logic. Data Preprocessing Logic can be used at the model build phase or the execute phase of the lifecycle.

Security

There are security concerns for any scenario where a customer or other external entity is providing code. The code could contain malicious actions that attempt to do things like access the OS, filesystem or another tenant's data. The code could attempt unauthorized behavior or attempt to crash the Hyperintelligence Computing System, Nodes, Server Intelligence Module, Client Intelligence Module, Client Device, one or more Networks or other component in the hyperintelligence system. Malicious and unauthorized behavior includes attempting to read any data from the cluster DB, read/write on the cluster filesystem, etc. Security settings will be managed with the Hyperintelligence Administration System by Administrator Computing System or Administration Client Intelligence Module.

Security Checks and Requirements:

All code/packages provided by customers/tenants must be digitally signed via code signing to confirm the software author and guarantee that the code has not been altered or corrupted since it was signed. Code signing uses a cryptographic hash to validate authenticity and integrity of code/packages provided by customers. Most code signing implementations will provide a digital signature mechanism to verify the identity of the author or publisher, and a checksum to verify that the code/package has not been modified. Code signing can also provide versioning information or other meta data about an object, code, and/or package. Code signing is based on public key infrastructure (PKI) technologies. A customer will sign code/packages with a private key. Then customer will provide the public key to the hyperintelligence system which will use the public key to verify authenticity of publisher and verify that the code/package has not been modified since signing. The integrity of the PKI system relies on publishers securing their private keys against unauthorized access. The public key used to authenticate the code signature should be linked to a trusted root certification authority (CA), preferably using a secure public key infrastructure (PKI). Code signing does not ensure that the code itself can be trusted. It provides a system to confirm what private key was used to sign the code and therefore who the code is from based on the entity named in the private key. A CA provides a root trust level and is able to assign trust to others by proxy. If a user/system trusts a CA, then the user/system can presumably trust the legitimacy of code that is signed with a key generated by that CA or one of its proxies. The hyperintelligence system shall trust certificates and keys generated by Entrust Datacard, VeriSign/Symantec, DigiCert, Comodo, GoDaddy and GlobalSign.

Check that code/package is authentic and from a known publisher. Tenant build packages must be signed with private key held by the tenant. Public key will be uploaded to Hyperintelligence Administration System by Administrator Computing System or Administration Client Intelligence Module. Public key viewable in Hyperintelligence Administration System.

Check that code/package has not been altered after code signing. Tenant builds packages must be signed with private key held by the tenant.

Platform user may select the use of either 1) a whitelist of approved publishers of code or 2) a blacklist of unapproved publishers of code. If using whitelist, then only code or packages published by publishers on the whitelist will be allowed to execute. If using blacklist, then only code or packages published by publishers on the blacklist will be blocked from execution and/or download.

For any tenant/customer using custom code, isolated tenancy is required. Isolated tenancy is a deployment where a tenant has its own separate infrastructure including but not limited to clusters, data stores, databases, and networks. This is necessary because code signing does not ensure the code can be trusted or that the code is free of bugs and defects.

Configuration Service

The Configuration Service is a key-value store with hyperintelligence system configuration information. It will use the Datastore Service and/or cache on the hyperintelligence computing system. The configuration information can be visualized as a tree. See below:

```
Root (Global key-values)
 | - maxPredictionTimeMillis=300
 | - workerTimePercent=0.75
 Tenant (id=101)
   | - maxPredictionTimeMillis=400
   Repository (name="hyintel-test")
     | - maxPredictionTimeMillis=500
     Dataset (name="shuttle-demo")
       | - maxPredictionTimeMillis=200
 Tenant (id=102)
   | - maxPredictionTimeMillis=700
   Repository (name="finance")
     | - maxPredictionTimeMillis=500
     Dataset (name="invoice")
       | - maxPredictionTimeMillis=100
     Dataset (name="purchase-order")
       | - maxPredictionTimeMillis=800
```

Configuration Service will have the following interfaces ConfigurationService.set(key, value, tenantId, repositoryName, datasetName) ConfigurationService.get(key, defaultValue, tenantId, repositoryName, datasetName) The get logic is:
1. If key null, throw exception with message "Key parameter cannot be null."
2. If datasetName does not equal null AND repository does not equal null AND tenantId does not equal null, search tree for node of /tenantId=tenantIdParam/repositoryName=repositoryNameParam/datasetName=datasetNameParam. If node does not exist, continue to next step. Otherwise search node for key. If key found then return value, otherwise continue to next step.
3. If repository does not equal null AND tenantId does not equal null, search tree for node of/tenantId=tenantIdParam/repositoryName=repositoryNameParam. If node does not exist, continue to next step. Otherwise search node for key. If key found then return value, otherwise continue to next step.
4. If tenantId does not equal null, search tree for node of/tenantId=tenantIdParam. If node does not exist, continue to next step. Otherwise search node for key. If key found then return value, otherwise continue to next step.
5. Search root node for key. If key found then return value, otherwise return defaultValue parameter value.

Potential Scenarios for Automated Analysis
1. Real-time interception of data in motion without connection to Customer database (DB): Intercept data and save to data store (Stream of data from client intercepting data, Talend component, Singer tap, etc). as a dataset. Dataset name is determined by the Client Intelligence Module or Server Intelligence Module.
2. Real-time interception of data in motion with connection to Customer DB: Intercept and use source to destination (S2D) map that provides mapping of each data field in the intercepted data to a field in the customer DB. Ability to create connection to customer DB is provided by Administration Server Intelligence Module via REST API that is used by Administration Client Intelligence Module.
3. Scanning of data at rest with connection to customer DB—Directly read customer DB for point in time (batch) audit.

For all the potential scenarios above, if the row count of the dataset exceeds a configured minimum row count (check needed to ensure hyperintelligence system can provide statically significant results) then proceed with Steps for Automated Analysis detailed below.

Edge Cases for Automated Analysis
What Happens when Customer DB Schema Changes (Delete Column, Add Column, Rename Column, Normalize, Denormalize, Rename Table, Etc.)?

For audits of live connections or imported/intercepted data, a full scan is done. The concern is labeled data when changes have occurred to the data model. Labeled data form an old schema should be used when a column is deleted. If a column is added, then labeled data cannot be used for models that require the column. A renamed column will be detected as a delete and new column. Data in motion with customer DB: The concern is labeled data when changes have occurred to the data model. Labeled data form an old schema should be used when a column is deleted. If a column is added, then labeled data cannot be used for models that require the column. A renamed column will be detected as a delete and new column. When displaying results, deleted columns will be shown and if values are available, they are shown, otherwise the cell is empty. During model build, only data from the customer DB and labeled data as previously described can be used.

NOTE: Must keep a copy of the schema for comparing between audit runs.

What Happens when the Schema of Intercepted Data Changes (Delete Column, Add Column, Rename Column)?

In the case of data in motion and no customer DB, the concern is labeled data when changes have occurred to the data model. Labeled data from an old schema should be used when a column is deleted. If a column is added, then labeled data cannot be used for models that require the column. A renamed column will be detected as a delete and new column. When displaying results, deleted columns will be shown and if values are available, they are shown, otherwise the cell is empty. During model build, only data from newest schema and labeled data as previously described can be used.

Model Build Lifecycle for Dataset
Prepare Model Build
Schema Inference

Query model template. If available, run the run_before_build step from the build_logic property. Then if available, run the validate_build_params step from the build_logic property.

When customer database connection provided, create Source to Destination (S2D) Map by asynchronously mapping intercepted data fields to the customer database fields and saving to Datastore Service.

When customer database connection provided and Data Preprocessing Logic available (see preprocess_data step of build_logic Model Template property), run Data Preprocessing Logic.

Asynchronously perform schema inference to detect data types of each field and save this meta data to the Datastore Service.

Relationship Configuration
Asynchronously create Relationship Configuration—Includes referential integrity (relationship) detection. Build a dependency tree to check which tables work as children and which as parents or both. Relationship Configuration is saved by Datastore Service.

Without connection to Customer DB—attempt to detect foreign keys by counting number of unique values. If percentage of unique values exceeds configured threshold then assume column is a foreign key. This will allow subsets to be created.

With connection to Customer DB—read the schema information provided by database to create Relationship Configuration.

All cases, support manual configuration of Relationship Configuration by a user
User validation/modification of Relationship Configuration must be supported.

Data Domain Detection
When Relationship Configuration complete, asynchronously detect data domain/format—detect email, time series, address, categories/groups, codes, names, salutations, date formats, etc. and add to meta data. Domain detectors are models which are executed by delegating the work to the Request Handler which performs these steps. (NOTE: There are different model types. One type of model might be profiler-domain-detector-address and there could be multiple address detector algorithms and associated models. During execution the models are executed concurrently for one type of model. Then the weighted average result by model type is calculated from all the model results.)

Asynchronously writes the usage data to Usage Datastore Service to track number of requests processed
Query metadata for the dataset which includes available models and recent average execution times of each model.
Query Model Group Configuration from in-memory cache for domain detectors. If not available or cache expired based on domainDetectorModelGroupConfigurationTimeoutMillis or expiration event triggered by model build, then run grouping algorithm as shown in Model Grouping Logic and create Message Items which are groups of models/rules that are executed by the same worker instance. Save Model Group Configuration to cache.

For each Message Item, send message to Queue for models/rules execution by Workers. Each Worker will do the following:
  a. For each model/rule in message:
    1. Lookup Model or Rule from in-memory cache. If not found, lookup model/rule from Model Storage Service and save to in-memory cache. [Must have capability to download a specific version of model, but the default behavior is to download newest version]
    2. If all security checks pass as described in the Security section, then execute model
    3. Put results on Results Cache;
  b. Asynchronously waits a configured time to receive all worker results from Results Cache. If Request Handler does not receive all results and complete remaining processing in the configured time, then response is returned to client informing that work is not complete and update metadata record for dataset in Datastore Service with result of timeout;
  c. Calculate weighted average for each profiler model type (profiler-domain-detector-email, etc.) using the default WAA for dataset/repository/tenant;
  d. Compare configured threshold (queried form configuration service) to weighted average to determine if result is true or false;
  e. Asynchronously update metadata record for dataset in Datastore Service with results.

Hyperintelligence system provides REST API for domain tags. Data domain tags will be shown in the metadata view of a dataset by the Hyperintelligence Administration System. This will enable out-of-the-box rules to be automatically applied to a column(s) with a specific data domain. User validation of data domain/format. This is an optional opportunity for a data steward/admin to review and confirm the data domain and format. User may thumb up (true positive) or thumb down (false positive) each data domain tag prediction which is saved in the metadata record for dataset in Datastore Service. User may user add a domain tag to a column or set of columns (false negative). When thumb down then this data domain tag is removed which causes the related models/rules to no longer be automatically executed on this dataset during data in motion or data at rest inspection. When a domain tag is added by user then models/rules associated with this domain tag will be automatically executed on this dataset during data in motion or data at rest inspection. Domain detector models continue to run during the model build phase. Labeled data for domain detector results will be used for weight optimization and training of domain detector models. When a domain tag for a specific dataset, column or column set was marked by a user as a false positive, if in the future the hyperintelligence system predicts that this data domain may apply then the tag will appear in the UI again but with a different color which indicates that the hyperintelligence system predicts the data domain but the associated error checking models for this domain are not being automatically executed. The user must thumb up the domain tag to enable the automatic checking again. Save all results to Datastore Service Join Configuration When Relationship Configuration is created and customer database (DB) is used, asynchronously create Join Configuration by joining each foreign key in the dataset (child) with data from the row referenced by the foreign key (parent table).
  a. For scanning of data at rest with connection to customer DB, use Relationship Configuration to create a Join Configuration based on a configured join depth. Each foreign key in the dataset (child) specify the key to child table as well as the columns to include from the parent table. By default, include all parent tables. Parent table might also have foreign keys to join to its parent tables. A configured join depth will determine the levels. Depth of 1 means child (dataset) table→parent table, 2 means child (dataset)→all parent tables→all grandparent tables, etc. User validation/editing of join configuration is required. A join configuration may specify any desired join depth for any table and any desired columns to include in the join. [UI Note for Hyperintelligence Administration System: When displaying error results of audit/scan and when joined data is predicted as an error, the foreign key in the parent will be marked as bad. The foreign key will be clickable to view the data in the child that is predicted as erroneous];
  b. For Real-time interception of data in motion with connection to Customer DB, the data that is joined to the dataset is determined by the S2D map after the creation of S2D map is complete. The map contains information to determine the join depth; and
  c. For real-time interception of data in motion without connection to Customer DB, joinConfigurationActive flag will be set to false (in other words skip joined dataset).

Data Subset Configuration

When Relationship Configuration is created, asynchronously create Subset Configuration based on Relationship Configuration by looping through each foreign key. For each foreign key and then each foreign key value (nested loop), create a subset query that filters the dataset by each value of a foreign key column. Save to Subset Configuration with Datastore Service. Optional user validation of subset configuration.

Data Profile
  1. For each dataset (regular, subset and joined), create a data profile. This is repeated at configured interval or before each model build because data can be added or changed. [Note: Most of the regular dataset profile will be viewable in the Intelligence Administration Server Module]
  2. Query profile metadata from cache. If not found query profile metadata from Datastore Service and save to cache. Metadata includes available profiler models (and optional Model Configuration that overrides the default in the model package for each), recent average execution times of each model, etc.
  3. For each dataset
    a. Asynchronously writes the usage data to Usage Datastore Service to track number of requests processed
    b. Query Model Group Configuration from in-memory cache. If not available or cache expired based on value of ConfigurationService key modelGroupConfigurationTimeoutMIllis, then run grouping algorithm as shown in Model Grouping Logic and create Message Items which are groups of models/rules that are executed by the same worker instance. Save Model Group Configuration to cache.

c. As necessary, provision cluster nodes for execution based on execution counters and node sizes in Runtime Configuration. If unutilized nodes matching node size are available, then use unutilized nodes.
d. For each Message Item, send message to Queue for models/rules execution by Workers. Each Worker will do the following:
   i. For each model/rule in message:
      1. Lookup Model or Rule from in-memory cache. If not found, lookup model/rule from Model Storage Service and save to in-memory cache.
      2. If all security checks pass as described in the Security section, then execute model
      3. Put results on Results Cache
e. Asynchronously waits to receive all worker results from Results Cache
f. Lookup default weighted averaging algorithm from Configuration Service: ConfigurationService.get ("waa.server.default", "waa.simple-python.latest", tenantId, repositoryName, datasetName);
g. Calculate weighted average for each type of profiler model (profiler-domain detector-email, profiler-domain-detector-zipcode, etc.)
h. Execute Decision Logic of correct runtime for each type of profiler model to determine final decision
i. Asynchronously update dataset metadata in Datastore Service with results and decisions
4. For each dataset
   a. For each row send row to the Request Handler which does the following:
      i. Asynchronously writes the usage data to Usage Datastore Service to track number of requests processed
      ii. If value of ConfigurationService key saveRawDataFlag is true, then asynchronously write the data to Datastore Service
      iii. Run grouping algorithm as shown in Model Grouping Logic for Concurrent to create Message Items which are groups of models/rules that are executed by the same worker instance.
      iv. As necessary, provision cluster nodes for execution based on execution counters and node sizes in Runtime Configuration of each model. If unutilized nodes matching node size are available, then use.
      v. For each Message Item, send message to Queue for models/rules execution by Workers. Each Worker will do the following:
         1. For each model/rule in message:
            a. Lookup Model or Rule from in-memory cache. If not found, lookup model/rule from Model Storage Service and save to in-memory cache.
            b. If all security checks pass as described in the Security section, then execute model
            c. Put results on Results Cache
      vi. Asynchronously waits to receive all worker results from Results Cache
      vii. Lookup default weighted averaging algorithm from Configuration Service: ConfigurationService.get("waa.server.default", "waa.simple-python.latest", tenantId, repositoryName, datasetName);
      viii. Calculate weighted average for each type of profiler model (profiler-domain detector-email, profiler-domain-detector-zipcode, etc.)
      ix. Execute Decision Logic of correct runtime for each type of profiler model to determine final decision
      x. Asynchronously update dataset metadata in Datastore Service with results and decisions
5. For each dataset
   a. For each row
      i. For each column send column to the Request Handler which does the following:
         1. Asynchronously writes the usage data to Usage Datastore Service to track number of requests processed
         2. If value of ConfigurationService key saveRawDataFlag is true, then asynchronously write the data to Datastore Service
         3. Run grouping algorithm as shown in Model Grouping Logic for Concurrent to create Message Items which are groups of models/rules that are executed by the same worker instance.
         4. As necessary, provision cluster nodes for execution based on execution counters and node sizes in Runtime Configuration of each model. If unutilized nodes matching node size are available, then use.
         5. For each Message Item, send message to Queue for models/rules execution by Workers. Each Worker will do the following:
            a. For each model/rule in message:
               i. Lookup Model or Rule from in-memory cache. If not found, lookup model/rule from Model Storage Service and save to in-memory cache.
               ii. If all security checks pass as described in the Security section, then execute model
               iii. Put results on Results Cache
         6. Asynchronously waits to receive all worker results from Results Cache
         7. Lookup default weighted averaging algorithm (WAA) from Configuration Service: ConfigurationService.get("waa.server.default", "waa.simple-python.latest", tenantId, repositoryName, datasetName);
         8. Calculate weighted average for each type of profiler model (profiler-domain detector-email, profiler-domain-detector-zipcode, etc.) using the default WAA for dataset/repository/tenant
         9. Execute Decision Logic of correct runtime for each type of profiler model to determine final decision
         10. Asynchronously update dataset metadata in Datastore Service with results and decisions Algorithm Selection Configuration
1. Lookup algorithm list (which includes algorithm matching criteria), if not found then download from repository and save to cache.
2. Create Algorithm Selection Configuration by looping through each dataset (regular, subset and joined) and do the following
   a. Check if metadata and Data Profile match the algorithm matching criteria. The algorithm matching criteria is provided in the algorithm package. If yes, add most recent version of algorithm (version maybe changed via Configuration Service key) and add default model level Rapid Optimization Logic (see Intelligence Model(s) Learning & Optimization section) for the algorithm to Algorithm Selection Configuration.

b. Note: In the case of TYPO (is a trademark/service-mark of Quatro Consulting LLC) for example, select zscore algorithm when the column has a normal distribution as defined by Data Profile. Select Ransac algorithm for correlated pairs as defined by Data Profile.
c. Create default row level Rapid Optimization Logic (see Intelligence Model(s) Learning & Optimization section) for the dataset
3. Save Algorithm Selection Configuration in dataset metadata in Datastore Service
4. User validation and editing Algorithm Selection Configuration is provided by the Hyperintelligence Administration System.

Build Predictor Models
1. These are the events that can trigger predictor models to be built for a dataset when a configured minimum record count is met
   a. Configured threshold is met for changes (create/update) to admin labels
   b. Configured threshold is met for changes (create/update) to dataset
   c. Configured model expiration is met
   d. Configured model building interval or schedule is met and changes to admin labels or dataset have occurred
2. Loop through items (dataset & selected algorithm & predictor model type combination) in Algorithm Selection Configuration. For each item (dataset & selected algorithm & predictor model type combination) in Algorithm Selection Configuration do following:
   e. Query Model Template based on version of the algorithm
   f. If available, then run determine_training_resources logic of build_logic property (see Model Template Properties) to determine the preferred node size and node number for training. Add to counter for the training node size.
   g. If available, then run determine_test_resources logic of build_logic property (see Model Template Properties) to determine the preferred node size and number for testing. Add to counter for the test node size.
   h. If available, then run determine_execute_resources logic of build_logic property (see Model Template Properties) to determine the preferred node size and number for model execution. Add to counter for the execution node size.
3. As necessary, provision cluster nodes for training based on training counters. If unutilized nodes matching node size are available, then use unutilized nodes.
4. As necessary, provision cluster nodes for testing based on testing counters. If unutilized nodes matching node size are available, then use unutilized nodes.
5. Add the preferred node sizes and number for model execution to the Runtime Configuration
6. Use Algorithm Selection Configuration to build each model for each dataset (regular, subset, joined). For each item (dataset & selected algorithm & predictor model type combination) in Algorithm Selection Configuration by sending each item to a Build Worker that will do following:
   i. Check in-memory cache for version of algorithm. If not found download version of algorithm package from Model Storage Service and unzip, then save to cache.
   j. Check preferred node size in Build Configuration and then use appropriate node for remaining steps
   k. Prepare initial data
   l. If available, then run preprocess data logic of build_logic property (see Model Template Properties)
   m. If dataset type is joined and value of ConfigurationService key joinConfigurationActive is not false, then use Join Configuration to query data, otherwise continue loop at next item.
   n. If dataset type regular, query data
   o. If dataset type is subset, then use Subset Configuration to query data.
   p. If available, then run prepare_data logic of build_logic property (see Model Template Properties).
   q. If available, then run select_features logic of build_logic property (see Model Template Properties) based on Feature Selection Configuration. NOTE: Use Relationship Configuration to exclude foreign keys, primary/unique keys from univariate models, etc. Feature Selection Configuration may decrease features or add features.
   r. Run train logic of build_logic property (see Model Template Properties)
   s. Package the model and Model Configuration with version then deploy package to Model Storage Service
   t. Add model test details to the metadata for the dataset. This will be queried by the Model Test Handler to determine the available models and what messages to put on the worker Queue.
   u. Perform model.optimization. Default logic which may be overridden/changed is to perform weight optimization (NOTE: Logic is executed here is completely customizable; therefore, deep learning, input optimization or other approaches may be implemented. Test model deployment, testing and other steps may be repeated): For each row of test data send to Model Test Handler which does the following:
      i. Query model from the Model Storage Service
      ii. Execute the newly built model
      iii. Calculate running average prediction accuracy (number of correction predictions/total predictions)
      iv. Set the weight for model to its average prediction accuracy and save this as part of the dataset metadata in the Datastore Service.
      v. Note: Model optimization may change Model Configuration like the Runtime Configuration parameters
   v. Package the model and Model Configuration with version then deploy package to Model Storage Service
   w. Add model details to the metadata for the dataset and save to Datastore Service. This will be queried by the Request Handler or Model Test Handler to determine the available models and what messages to put on the worker Queue. (Note: Querying this information during the model execution phase allows the Model Configuration and metadata to change without rebuilding the model. Model Configuration should only be added to the dataset metadata when the Model Configuration differs from the Model Configuration in the deployed model package. Otherwise unnecessary additional processing occurs.)
   x. Fire event to expire Model Group Configuration for this dataset y. If available, then run run_after_build logic of build_logic property (see Model Template Properties)

Build Profiler Models
1. These are the events that can trigger profiler models to be built for a dataset when a configured minimum record count is met
   a. Configured threshold is met for changes (create/update) to admin labels for profile
   b. Configured threshold is met for changes (create/update) to dataset
   c. Configured model expiration is met
   d. Configured model building interval or schedule is met and changes to admin labels or dataset have occurred
2. Query Algorithm Selection Configuration for dataset from the Datastore Service. Loop through items (dataset & selected algorithm & profiler type combination) in Algorithm Selection Configuration. For each item (dataset & selected algorithm & profiler type combination) in Algorithm Selection Configuration do following:
   a. Query Model Template based on version of the algorithm
   b. If available, then run determine_training_resources logic of build_logic property (see Model Template Properties) to determine the preferred node size and node number for training. Add to counter for the training node size.
   c. If available, then run determine_test_resources logic of build_logic property (see Model Template Properties) to determine the preferred node size and number for testing. Add to counter for the test node size.
   d. If available, then run determine_execute_resources logic of build_logic property (see Model Template Properties) to determine the preferred node size and number for model execution. Add to counter for the execution node size.
3. As necessary, provision cluster nodes for training based on training counters. If unutilized nodes matching node size are available, then use unutilized nodes.
4. As necessary, provision cluster nodes for testing based on testing counters. If unutilized nodes matching node size are available, then use unutilized nodes.
5. Add the preferred node size and number for model execution to the Runtime Configuration
6. Use Algorithm Selection Configuration to build each model for each dataset (regular, subset, joined). For each item (dataset & selected algorithm & profiler model type combination) in Algorithm Selection Configuration by sending each item to a Build Worker that will do following:
   a. Check in-memory cache for version of algorithm. If not found download version of algorithm package from Model Storage Service and unzip, then save to cache.
   b. Check preferred node size in Build Configuration and then use appropriate node for remaining steps
   c. Prepare initial data
   d. If available, then run preprocess_data logic of build_logic property (see Model Template Properties)
   e. If dataset type is joined and value of ConfigurationService key joinConfigurationActive is not false, then use Join Configuration to query data, otherwise continue loop at next item
   f. If dataset type regular, query data
   g. If dataset type is subset, then use Subset Configuration to query data.
   h. If available, then run prepare_data logic of build_logic property (see Model Template Properties)
   i. If available, then run select_features logic of build_logic property (see Model Template Properties) based on Feature Selection Configuration. NOTE: Use Relationship Configuration to exclude foreign keys, primary/unique keys from univariate models, etc. Feature Selection Configuration may decrease features or add features.
   j. Run train logic of build_logic property (see Model Template Properties)
   k. Package the model and Model Configuration with version then deploy package to Model Storage Service
   l. Add model test details to the metadata for the dataset. This will be queried by the Model Test Handler to determine the available models and what messages to put on the worker Queue.
   m. Perform model optimization. Default logic which may be overridden/changed is to perform weight optimization (NOTE: Logic is executed here is completely customizable; therefore, deep learning, input optimization or other approaches may be implemented. Test model deployment, testing and other steps may be repeated): For each row of test data send to Model Test Handler which does the following:
      i. Query model from the Model Storage Service
      ii. Execute the newly built model
      iii. Calculate running average prediction accuracy (number of correction predictions/total predictions)
      iv. Set the weight for model to its average prediction accuracy and save this as part of the dataset metadata in the Datastore Service.
      v. Note: Model optimization may change Model Configuration like the Runtime Configuration parameters
   n. Package the model and Model Configuration with version then deploy package to Model Storage Service
   o. Add model details to the metadata for the dataset and save to Datastore Service. This will be queried by the Request Handler or Model Test Handler to determine the available models and what messages to put on the worker Queue. (Note: Querying this information during the model execution phase allows the Model Configuration and metadata to change without rebuilding the model. Model Configuration should only be added to the dataset metadata when the Model Configuration differs from the Model Configuration in the deployed model package. Otherwise unnecessary additional processing occurs.)
   p. Fire event to expire Model Group Configuration for this dataset
   q. If available, then run run_after_build logic of build_logic property (see Model Template Properties)

Model Execution Lifecycle
Execute Predictor Model
Scanning of Data at Rest
1. For selected dataset or database, confirm current models are available if not then, execute Build Profiler Model DAG and Build Predictor Model DAG.
2. For each selected table a. Query metadata from cache. If not found query metadata from Datastore Service and save to cache. Metadata for the dataset includes available models (and optional Model Configuration that overrides the default in the model package for each), recent average execution times of each model, Data Preprocessing Logic (this is logic that is executed prior to executing models and is an opportunity to transform the data), etc.
b. For each row and model type (see type property of Model Template Properties section) found in dataset metadata:
  i. Query Model Template for model. If available, run the run_before_execute step from the execute_logic property. Then if available, run the validate_execute_params step from the build_logic property.
  ii. If available, then run preprocess_data logic of execute_logic property (see Model Template Properties)
  iii. If not created, create Default Row Hash
  i. Execute row level Rapid Optimization Logic (see Intelligence Model(s) Learning & Optimization section) and if non-null result provided, then:
    1. Asynchronously writes the usage data to Usage Datastore Service to track number of requests processed
    2. If value of ConfigurationService key saveRawDataFlag is true, then asynchronously write data in Datastore Service. Otherwise, in the case of TYPO ((is a trademark/servicemark of Quatro Consulting LLC) save only data in Datastore Service if decision is error.
    3. Asynchronously save results and decisions in Datastore Service. Note: Result should include result type of rapid optimization so calculation of mean model execution time (as described in Model Grouping Logic for Concurrent Execution by Workers section) can exclude this execution time.
    4. If value of ConfigurationService key saveToBlockchain is true, then asynchronously save data, dataset metadata and information, model information (version, inputs, etc.), results, decisions, any available feedback, any available user information, and source of data to Blockchain Service.
    5. Continue to next row and do not process remaining steps for current row
  ii. Send row to the Audit Request Handler which does the following:
    1. Asynchronously writes the usage data to Usage Datastore Service to track number of requests processed
    2. If value of ConfigurationService key saveRawDataFlag is true, then asynchronously write the data to Datastore Service
    3. Run grouping algorithm as shown in Model Grouping Logic for Concurrent to create Message Items which are groups of models/rules that are executed by the same worker instance.
    4. As necessary, provision cluster nodes for execution based on execution counters and node sizes in Runtime Configuration of each model. If unutilized nodes matching node size are available, then use unutilized nodes.
    5. For each Message Item (which contains all necessary dataset metadata to run model like S2D map, Model Configuration, Feature Selection Configuration, Row Hash, etc.), send message to Queue for models/rules execution by Workers. Each Worker will do the following:
      a. For each model/rule in message:
        i. Lookup Model or Rule from in-memory cache. If not found, lookup model/rule from Model Storage Service and save to in-memory cache. [Must have capability to download a specific version of model, but the default behavior is to download newest version]
        ii. Execute model level Rapid Optimization Logic and if non-null result provided, then:
          1. Put result on Results Cache. Note: Result should include result method type of rapid optimization so calculation of mean model execution time (as described in Model Grouping Logic for Concurrent Execution by Workers section) can exclude this execution time.
          2. Worker exits because work is complete
        iii. If all security checks pass as described in the Security section, then execute model. Run the execute step from the execute_logic property (see Model Template Properties). Then if available, run the run_after_execute step from the execute_logic property (see Model Template Properties).
        iv. Put results on Results Cache
    6. Asynchronously waits to receive all worker results from Results Cache
    7. Lookup default weighted averaging algorithm (WAA) from Configuration Service: ConfigurationService.get("waaserver.default", "waa.simple-python.latest", tenantId, repositoryName, datasetName);
    8. Calculate weighted average final result for each type of model (predictor-duplicate, predictor-error, etc.) using the default WAA for dataset/repository/tenant
    9. For each type of model run the Decision Logic to generate a decision.
    10. Asynchronously update record in Datastore Service with results and decisions. In the case of TYPO ((is a trademark/servicemark of Quatro Consulting LLC), if value of ConfigurationService key saveRawDataFlag is not true, and result is error, then save data in Datastore Service.
    11. If value of ConfigurationService key saveToBlockchain is true, then asynchronously save data, dataset metadata and information, model information (version, inputs, etc.), results, decisions, any available feedback, any available user information, and source of data to Blockchain Service.
3. For each table
  a. Asynchronously writes the usage data to Usage Datastore Service to track number of requests processed
  b. Query metadata from cache. If not found query metadata from Datastore Service and save to cache. Metadata for the dataset includes available models (and Model Configuration for each), recent average execution times of each model, etc.

c. Query Model Template for model. If available, run the run_before_execute step from the execute_logic property. Then if available, run the validate_execute_params step from the build logic property.
d. If available, then run preprocess_data logic of execute_logic property (see Model Template Properties)
e. Query Model Group Configuration from in-memory cache. If not available or cache expired based on modelGroupConfigurationTimeoutMillis, then run grouping algorithm as shown in Model Grouping Logic and create Message Items which are groups of models/rules that are executed by the same worker instance. Save Model Group Configuration to cache.
f. As necessary, provision cluster nodes for execution based on execution counters and node sizes in Runtime Configuration. If unutilized nodes matching node size are available, then use unutilized nodes.
g. For each Message Item, send message to Queue for models/rules execution by Workers. Each Worker will do the following:
  i. For each model/rule in message:
    1. Lookup Model or Rule from in-memory cache. If not found, lookup model/rule from Model Storage Service and save to in-memory cache. [Must have capability to download a specific version of model, but the default behavior is to download newest version]
    2. If all security checks pass as described in the Security section, then execute model (MessageItem contains all necessary dataset metadata to run model like S2D map, Model Configuration, Feature Selection Configuration, etc.). Run the execute step from the execute_logic property (see Model Template Properties). Then if available, run the run_after_execute step from the execute_logic property (see Model Template Properties).
    3. Put results on Results Cache
h. Asynchronously waits to receive all worker results from Results Cache
i. Lookup default weighted averaging algorithm from Configuration Service: ConfigurationService.get ("waa.server.default", "waa.simple-python.latest", tenantId, repositoryName, datasetName);
j. Calculate weighted average for each type of model (predictor-duplicate, predictor-error, etc.) using the default WAA for dataset/repository/tenant
k. For each type of model run the Decision Logic to generate a decision.
l. Asynchronously update record in Datastore Service with results and decisions
m. If value of ConfigurationService key saveToBlockchain is true, then asynchronously save data, dataset metadata and information, model information (version, inputs, etc.), results, decisions, any available feedback, any available user information, and source of data to Blockchain Service.

Real-Time Interception of Data in Motion
1. Intelligence Client Module does the following:
  a. [Initialization] Download configuration (including the threshold for comparing to final weighted average result in later step, S2D Map, Model Templates, Feature Selection Configuration, Security information, etc.) from Configuration Endpoint then apply configuration
  b. [Initialization] Asynchronously check Datastore Service for labeled data to create the labeled data cache, client-side models and default WAA for runtime of client and download all client-side models, metadata of datasets, and WAAs to cache (browser local storage). NOTE: Browser local storage has 10 MB per origin (aka domain)limit so a single model cannot exceed 10 MB and when multiple models exceed 10 MB then multiple origins are used.
  c. [Initialization] Check local cache for data, results and decisions that need to be sent to Request Handler Service. If they exist, then asynchronously send them to the Request Handler Service.
  d. Asynchronously, perform all [Initialization] steps on a configured interval
  e. Intercept data
  f. Create Default Row Hash (see Intelligence Model(s) Learning & Optimization section)
  g. Execute Data Preprocessing Logic
  h. For each model type (see type property of Model Template Properties section) found in configuration, execute row level Rapid Optimization Logic (see Intelligence Model(s) Learning & Optimization section) and if non-null result provided, then:
    i. If configured and feature supported by client, take screenshots at configured interval
    ii. Sends data, results, and decisions to Request Handler Service that does the following (NOTE: If the Request Handler Service is unavailable, then cache the data, results, and decisions and send to Request Handler Service when available):
      1. Asynchronously writes the usage data to Usage Datastore Service to track number of requests processed
      2. Asynchronously writes the intercepted data, results, and decisions to Datastore Service
      3. If value of ConfigurationService key saveToBlockchain is true, then asynchronously save data, dataset metadata and information, model information (version, inputs, etc.), results, decisions, any available feedback, any available user information, and source of data to Blockchain Service.
    iii. Asynchronously fire appropriate event based on result
    iv. If user or system consuming results provides feedback, asynchronously send feedback to Request Handler
    v. Asynchronously, perform real-time learning by updating models and client cache of labeled data for the dataset with feedback.
    vi. If configured and feature supported by client, asynchronously send screenshots to Hyperintelligence Computing System to be saved by the Datastore Service
    vii. Client stops any further processing of intercepted data (It does not continue to 2.e. or 3.)
  i. Asynchronously check cache for all applicable client-side models for the intercepted data. If one or more not found, then download from Model Storage Service and add to cache.
  j. Wait asynchronously and when each model is downloaded, if all security checks pass as described in the Security section, then execute model. Run the execute step from the execute_logic property (see Model Template Properties). Then if available, run the run_after_execute step from the execute_logic property (see Model Template Properties).
k. For each current model in cache, if all security checks pass as described in the Security section, then execute model. Run the execute step from the execute_logic property (see Model Template Properties). Then if available, run the run_after_execute step from the execute_logic property (see Model Template Properties).
l. In the case of TYPO (is a trademark/servicemark of Quatro Consulting LLC), run client-side rules in configuration. If rules do not pass then fire event and stop, otherwise continue 2. Intelligence Client Module sends data to Request Handler Service that does the following (NOTE: If the Request Handler Service is unavailable, then cache the data, results, and decisions and send to Request Handler Service when available):
   a. Asynchronously writes the usage data to Usage Datastore Service to track number of requests processed
   b. Query metadata for the dataset which includes available models (and Model Configuration for each), recent average execution times of each model, S2D map if customer DB connection scenario, Model Template, Data Preprocessing Logic (this is logic that is executed prior to executing models and is an opportunity to transform the data), Feature Selection Logic, etc.
   c. Asynchronously writes the intercepted data to Datastore Service
   d. If row hash not provided by Intelligence Client Module, create Default Row Hash
   e. Query Model Group Configuration from in-memory cache. If not available or cache expired based on modelGroupConfigurationTimeoutMillis or expiration event triggered by model build, then run grouping algorithm as shown in Model Grouping Logic and create Message Items which are groups of models/rules that are executed by the same worker instance. Save Model Group Configuration to cache.
   f. As necessary, provision cluster nodes for execution based on execution counters and node sizes in Runtime Configuration. If unutilized nodes matching node size are available, then use unutilized nodes.
   g. For each Message Item (which contains all necessary dataset metadata to run model like S2D map, Model Configuration, Model Template, Feature Selection Configuration, Row Hash, etc.), send message to Queue for models/rules execution by Workers. Each Worker will do the following:
      i. For each model/rule in message:
         1. Lookup Model or Rule from in-memory cache. If not found, lookup model/rule from Model Storage Service and save to in-memory cache. [Must have capability to download a specific version of model, but the default behavior is to download newest version]
         2. If available, run the run_before_execute step from the execute_logic property (see Model Template Properties). Then if available, run the validate_execute_params step from the build logic property (see Model Template Properties).
         3. If available, then run preprocess_data logic of execute_logic property (see Model Template Properties)
         4. Execute model level Rapid Optimization Logic (see Intelligence Model(s) Learning & Optimization section) and if non-null result provided, then
            a. Put results on Results Cache. Note: Result should include result type of rapid optimization so calculation of mean model execution time (as described in Model Grouping Logic for Concurrent Execution by Workers section) can exclude this execution time.
            b. Worker exits because work is complete
         5. If all security check pass as described in Security section, then execute model. Run the execute step from the execute_logic property (see Model Template Properties). Then if available, run the run_after_execute step from the execute_logic property (see Model Template Properties).
         6. Put results on Results Cache
   h. Asynchronously waits a configured time to receive all worker results from Results Cache. If Request Handler does not receive all results and complete remaining processing in the configured time, then response is returned to client informing that work is not complete and update record in Datastore Service with result of timeout.
   i. Calculate server-side weighted average for each type of model (predictor-duplicate, predictor-error, etc.) using the default WAA queried from ConfigurationService for dataset/repository/tenant
   j. Run Decision Logic for each model type to determine decisions
   k. Asynchronously update record in Datastore Service with results and decisions
   l. If value of ConfigurationService key saveToBlockchain is true, then asynchronously save data, dataset metadata and information, model information (version, inputs, etc.), results, decisions, any available feedback, any available user information, and source of data to Blockchain Service.
   m. Asynchronously sends all available results and decisions in response returned to client 3. Intelligence Client Module does the following:
   a. If configured and feature supported by client, take screenshots at configured interval
   b. Receive response from Request Handler
   c. Calculate the weighted average final result with client-side model results and server-side model results (not server-side final result) for each type of model (predictor-duplicate, predictor-error, etc.) using the default WAA for dataset/repository/tenant
   d. Run Decision Logic for each model type to generate decisions
   e. Asynchronously send results and decisions to Request Handler which does the following (NOTE: If the Request Handler Service is unavailable, then cache the data, results, and decisions and send to Request Handler Service when available):
      i. Asynchronously update record in Datastore Service with results and decisions
      ii. If value of ConfigurationService key saveToBlockchain is true, then asynchronously save data, dataset metadata and information, model information (version, inputs, etc.), results, decisions, any available feedback, any available user information, and source of data to Blockchain Service.

f. Asynchronously fire appropriate events based on decisions
g. If user or system consuming results provides feedback, asynchronously send feedback to Request Handler which does the following (NOTE: If the Request Handler Service is unavailable, then cache the data, results, and decisions and send to Request Handler Service when available):
   i. Asynchronously update record in Datastore Service with results and decisions
   ii. If value of ConfigurationService key saveToBlockchain is true, then asynchronously save data, dataset metadata and information, model information (version, inputs, etc.), results, decisions, any available feedback, any available user information, and source of data to Blockchain Service.
h. Asynchronously, perform real-time learning by updating models and client cache of labeled data for the dataset with feedback.
i. If configured and feature supported by client, asynchronously send screenshots to Hyperintelligence Computing System to be saved by the Datastore Service Model Grouping Logic for Concurrent Execution by Workers The model grouping ensures that the granularity of the unit of work performed by a Worker is not too short. Some models execute so fast that running each concurrently would take longer than running them sequentially (non-concurrently). A model group is a set of one or more models grouped into a unit of work that is performed by one Worker. The grouping logic controls the granularity of the unit of work. It needs to be small but not too small that concurrent execution is slower than sequential.

This algorithm groups the longest running models/runs with the shortest running based on a configured maximum execution time. Efficient execution of models is best determined by the available hardware platform, OS and resources (RAM, CPU speed, network, etc) available for the worker. This algorithm assumes that the workers are homogeneous with the same resources which makes this algorithm cloud friendly.

The hyperintelligence computing system server(s) will track execution times of all models. A batch process running at a configured interval will calculate the mean execution time in milliseconds of models for each dataset (normal, subset, joined, etc.). If a prediction/decision was made using Rapid Optimization Logic, then this execution time should not be included in the mean execution time calculation because the execution did not occur on the cluster.

A user may provide custom Model Grouping Logic. The default Model Grouping Logic will sort all models to be executed by their mean execution time in descending order. Then create groups of models where the sum of mean execution time for each group does not exceed the product of the value of ConfigurationService key maxPredictionTimeMillis and the value of ConfigurationService key workerTimePercent. Any model with mean execution time that exceeds the product of the value of ConfigurationService key maxPredictionTimeMillis and the value of ConfigurationService key workerTimePercent will be in a group with only one model. A Worker will sequentially execute each model in a group. Below is the default Model Grouping Logic in Java pseudo code, other implementations may achieve the same or similar behavior:

```
import java.util.*;
Collection<ModelInfo> modelInfos = new ArrayList<ModelInfo>( );
Collection<ModelInfo> modelInfosSortedDescending = /* ArrayList<ModelInfo> sorted
descending by mean execution time */
Collection<Collection> messageItems = new ArrayList<Collection>( );
int smallestTimeIndex = (modelInfosSortedDescending.length > 0 ?
modelInfosSortedDescending.length - 1 : 0);
ModelInfo[ ] modelInfosSortedDescendingArray = modelInfosSortedDescending.toArray( );
int constant MAX_PREDICTION_TIME_MILLIS =
ConfigurationService.getInstance( ).get("maxPredictionTimeMillis", "500", tenantId,
repositoryName, datasetName);
int constant WORKER_TIME_PERCENT =
ConfigurationService.getInstance( ).get("workerTimePercent", "0.75", tenantId, repositoryName,
datasetName);
int constant MAX_WORKER_TIME_MILLIS = MAX_PREDICTION_TIME_MILLIS *
WORKER_TIME_PERCENT;
for (int i = 0; i < modelInfosSortedDescendingArray.length && smallestTimeIndex >= 0; i++) {
    List<ModelInfo> group = new ArrayList<ModelInfo>( );
    if (modelInfosSortedDescendingArray[i].meanExecutionTimeMillis >=
MAX_WORKER_TIME_MILLIS) {
        group.add(modelInfosSortedDescendingArray[i]);
        messageItems.add(group);
        continue;
    }
    if (smallestTimeIndex == i) {
        group.add(modelInfosSortedDescendingArray[i]);
        messageItems.add(group);
        break;
    }
    int groupTimeMillis = modelInfosSortedDescendingArray[i].meanExecutionTimeMillis;
    group.add(modelInfosSortedDescending Array[i]);
    while (groupTimeMillis < MAX_WORKER_TIME_MILLIS && smallestTimeIndex > i) {
        groupTimeMillis +=
modelInfosSortedDescendingArray[smallestTimeIndex].meanExecutionTimeMillis;
```

```
        if (groupTimeMillis > MAX_WORKER_TIME_MILLIS) {
    break;
        }
        group.add(modelInfosSortedDescendingArray[smallestTimeIndex]);
    smallestTimeIndex--;
    }
    messageItems.add(group);
}
```

Metric Tracking

Metric tracking is necessary to understand the state of hyperintelligence system including the datasets, models and results overtime. Periodic and accumulating snapshots will be supported and calculated by a batch process running on a configurable interval. Understanding if decisions and predictions made by the hyperintelligence system are getting better or worse over time is a requirement. The hyperintelligence system must provide trending metrics per dataset, per repository, and all repositories for a tenant. Metrics shall include:

Values of all data profile metrics

Results of each model execution (and fingerprint/user)

Weighted average results of multiple models for each model type

User responses and labels

Administrator labels

In the description and FIGS. 1-12, devices, systems and sequence or state diagrams were shown to illustrate the methods executed in or by a hyperintelligence system and one or more networks and computing environment, in accordance with some embodiments in various deployment configurations. In accordance with the embodiments, a method for interpreting inputted information comprising processing inputted information wherein processing inputted information uses one or more intelligence modules using one or more intelligence models to process the inputted information; making, by the one or more intelligence modules, one or more decisions about inputted information based on the one or more intelligence models; learning, by the one or more intelligence modules, to update the one or more intelligence models; and interpreting inputted information based on the one or more decisions has been disclosed.

Also disclosed is such method wherein the learning is based on one or more of the following: inputted information, feedback from a user, feedback from a device, feedback from a system, and information in a data store. Shown and described was the method further executing the intelligence models concurrently to process inputted information to make one or more decisions based on the intelligence models.

The method further comprises one or more client devices having a client intelligence module and a data store accessible by the client intelligence module and comprises one or more networks coupling each client device wherein the making one or more decisions and learning are executed concurrently by client intelligence modules using the one or more networks.

The method further comprises a client intelligence module and a data store accessible by the client intelligence module.

The method wherein processing inputted information includes storing inputted information in the data store.

The method wherein the making one or more decisions and learning are executed by the client intelligence module.

The method wherein the making one or more decisions and learning are concurrently executed by the client intelligence module.

The method wherein the one or more decisions are stored in the data store.

The method further comprising a hyperintelligence computing system having a server intelligence module.

The method wherein the making one or more decisions and learning are concurrently executed by the intelligence modules in at least one or more of the following: one or more client devices, one or more hyperintelligence computing systems, one or more proxy systems, or one or more destination computer systems.

The method further comprising one or more networks coupling one or more of the following: one or more client device, one or more hyperintelligence computing systems, one or more proxy systems, one or more destination computer systems, or any combination of the aforementioned or one or more client intelligence modules using the one or more networks and the one or more server intelligence modules using the one or more networks.

The method further comprising a hyperintelligence administration system coupled to one or more networks and having an administration server intelligence module.

The method further comprising an administrator computing system coupled to one or more networks and having an administration client intelligence module.

The method further comprising passing, by the one or more intelligence modules, inputted information along wherein passing the information along uses the one or more decisions as determined by the one or more intelligence modules.

The method further comprising changing inputted information before passing information along using the one or more decisions as determined by the one or more intelligence modules.

The method further comprising generating, by the one or more intelligence modules, one or more responses to the inputted information.

The method further comprising passing, by the one or more intelligence modules, inputted information using available feedback related to the one or more responses as determined by the one or more intelligence modules.

The method further comprising changing inputted information before passing information along using available feedback related to the one or more responses as determined by the one or more intelligence modules.

The method wherein processing inputted information includes processing a continuous stream of information in real-time and intercepting information in real-time.

The method further comprising one or more client devices each having a client intelligence module and one or more networks coupling each client device wherein the step of making, by the one or more intelligence modules, one or more decisions about inputted information further and learning are offline executed when one or more networks is unavailable, one or more client devices are unavailable, one or more client intelligence modules are unavailable, or the one or more client devices are not coupled by the one or more networks to other systems.

The method wherein the making one or more decisions and learning are offline executed when one or more of the following occurs: the one or more networks is unavailable, one or more client devices are unavailable or not coupled by the one or more networks to other systems or client devices, one or more intelligence modules are unavailable, one or more hyperintelligence computing systems are unavailable or not coupled by the one or more networks to other systems or client devices, one or more proxy systems are unavailable or not coupled by the one or more networks to other systems or client devices, one or more destination computer systems are unavailable or not coupled by the one or more networks to other systems or client devices.

The method wherein the learning step further comprises real-time learning, by the one or more intelligence modules, to update the one or more intelligence models.

The method further comprising the assignment of weights to one or more intelligence models and said weights are used by a weighted average algorithm to make, by the one or more intelligence modules, one or more decisions about inputted information based on the one or more weighted intelligence models.

The method further comprising weight optimizing one or more intelligence modules.

The method further comprising security for using the one or more intelligence models.

The method further comprising storing one or more of the following: information inputted, one of more decisions by the one or more intelligence modules, or one or more results of the one or more intelligence models. The method further comprising securely storing one or more of the following: information inputted, one of more decisions by the one or more intelligence modules, or one or more results of the one or more intelligence models. The method further comprising securely storing, in an authentic, unalterable, verifiable, permanent and distributed way, one or more of the following: information inputted, one of more decisions by the one or more intelligence modules, or one or more results of the one or more intelligence models. The method further comprising storing, in one or more blockchains, one or more of the following: information inputted, one of more decisions by the one or more intelligence modules, or one or more results of the one or more intelligence models. The method further comprises storing one or more of: the one or more responses or available feedback related to the one or more responses; further comprising securely storing one or more of the following: the one or more responses or available feedback related to the one or more responses or further comprising securely storing, in an authentic, unalterable, verifiable, permanent and distributed way, one or more of the following: the one or more responses or available feedback related to the one or more responses. The may also further comprise storing, in one or more blockchains, one or more of the following: the one or more responses or available feedback related to the one or more responses. The method further comprising supporting one or more versions of the one or more intelligence modules. The method further comprising an administrator computing system couple to one or more networks. In yet another embodiment, method for interpreting inputted information, the method comprising: making, by one or more intelligence modules, one or more decisions about inputted information based on one or more intelligence models; learning, by the one or more intelligence modules; and wherein the learning step further comprises the step of optimizing, by the one or more intelligence modules, the one or more intelligence models using feedback related to the one or more decisions.

Still referring to FIGS. 1-12, the devices, systems and sequence or state diagrams show additional methods executed in or by a hyperintelligence system and one or more networks and computing environment, in accordance with some embodiments in various deployment configurations. In accordance with the embodiments, an additional method is described for interpreting information input from an input device, the method comprising processing information inputted from the input device wherein processing information inputted uses one or more intelligence modules to process the information inputted before passing information along, the one or more intelligence modules using one or more intelligence models to make one or more decisions about the information inputted; making, by the one or more intelligence modules, one or more decisions about the information inputted-based on the one or more intelligence models; passing, by the one or more intelligence modules, the information inputted along wherein passing the information along uses the one or more decisions as determined by the one or more intelligence modules; changing the information inputted before passing information along using the one or more decisions as determined by the one or more intelligence modules; and learning, by the one or more intelligence modules, to update the one or more intelligence models.

In accordance with the embodiments, another additional method for interpreting information input from an input device comprising processing information inputted from the input device wherein processing information inputted uses intelligence modules having intelligence models to process the information inputted before passing information along; executing, by the intelligence modules, the intelligence models concurrently to process information inputted from the input device to generate one or more real-time decisions based on the intelligence models; learning, by the intelligence modules, through concurrent optimization of the intelligence models; and passing information corresponding to the information inputted using the one or more real-time decisions as determined by the intelligence modules.

In accordance with the embodiments, yet another additional method for interpreting information input from an input device, the method comprising processing information inputted from the input device wherein processing information inputted uses intelligence modules having intelligence models to process the information inputted before passing information along; executing, by the intelligence modules, the intelligence models concurrently to process information inputted from the input device to generate one or more real-time decisions based on the intelligence models; learning, by the intelligence modules, through concurrent optimization of the intelligence models; passing, by the one or more intelligence modules, the information inputted along wherein passing the information uses the one or more real-time decisions as determined by intelligence modules; and changing the information inputted before passing information along using the one or more real-time decisions as determined by the intelligence modules. The method or other methods herein wherein all steps do not require lifeform intelligence or interaction or not require lifeform intelligence. The method set forth wherein prior knowledge or conditions, including but not limited to source, destination, transport mechanism, type, format, structure, schema, or related information, of the inputted data is not required to perform all steps. The methods set forth herein wherein prior knowledge or conditions, including but not limited to source, destination, transport mechanism, type, format, structure, schema, or related information, of the inputted data or the one or more responses or available feedback related to the one or more responses is not required to perform all steps of the of the methods herein. The method wherein inputted information may be structured or unstructured. The method herein wherein inputted information may be structured or unstructured. The method wherein the one or more decisions are made through the execution of a decision plan providing workflow. The method set forth herein of wherein the one or more decisions are made through the execution of a decision plan providing workflow; wherein the one or more decisions are made through the execution of a decision plan providing workflow which considers the one or more responses to the inputted information in real-time; or further comprising automated provisioning and scaling of one or more of the following: the intelligence modules, services within the intelligence modules, or cloud infrastructure upon which the intelligence modules run.

There are many applications for hyperintelligence system 300. Example applications/use cases include, but are not limited to, data quality, retail consumer profiling and promotion, autonomous vehicle, industrial automation, oil & gas exploration and production, transportation, financial services and trading or any other application benefiting from predicting or making a decision based off existing or incoming information and then taking real-time or immediate action.

Referring now to FIGS. 13-15, hyperintelligence system 300 data quality application/use case will be described. In FIGS. 13-15 arrows show the flow of inputted information and data. FIG. 13 depicts one prior art traditional data quality tool 1300 for data quality which attempts to resolve data errors after they are saved. FIG. 13 illustrates client input devices 1310 delivering inputted information to an enterprise computing system 1320. Enterprise computing system 1320 delivers the inputted information or data to a database/data store 1330. Database/data store 1330 delivers the inputted information/data to other database/data lake/cloud storage 1340. As shown, traditional data quality tool 1300 quarantines data errors in the error database/data store 1350 after the inputted information data has been saved to database/data store 1330. Juxtaposing FIG. 14 to FIG. 13, wherein FIG. 14 shows application/use case of hyperintelligence system 1400, also known as TYPO (IS A TRADEMARK/SERVICEMARK OF QUATRO CONSULTING LLC), using the methods and systems described above in accordance with the embodiments with artificial intelligence (AI) to detect errors in real-time at the initial point of entry prior to delivering inputted information/data to database/data store 1430. This enables immediate correction of errors prior to storage and propagation into downstream systems and reports. TYPO (IS A TRADEMARK/SERVICEMARK OF QUATRO CONSULTING LLC) can be used on web applications, mobile apps, devices and data integration tools.

As shown in FIG. 14, client input devices 1410 deliver inputted information to hyperintelligence system TYPO 1400 before passing inputted information/data to enterprise computing system 1420. Enterprise computing system 1420 delivers the inputted information or data to a database/data store 1430. Database/data store 1430 delivers the inputted information/data to other database/data lake/cloud storage 1440. TYPO (IS A TRADEMARK/SERVICEMARK OF QUATRO CONSULTING LLC) 1400 inspects data in motion from client input devices 1410 before it enters enterprise computing system 1420. TYPO (is a trademark/servicemark of Quatro Consulting LLC) provides comprehensive oversight of data origins and points of entry into information systems including devices, APIs and application users. When an error is identified, the user, device and/or system is notified and given the opportunity to correct the error. TYPO (IS A TRADEMARK/SERVICEMARK OF QUATRO CONSULTING LLC) 1400 uses the previously described methods, systems and machine learning algorithms/intelligence models to detect errors. In accordance with the previous described embodiments, TYPO (IS A TRADEMARK/SERVICEMARK OF QUATRO CONSULTING LLC) 1400 learns from user responses to error notifications and/or results and adapts as data quality requirements change. Upon data inception, TYPO (IS A TRADEMARK/SERVICEMARK OF QUATRO CONSULTING LLC) 1400 identifies errors and prompts the user, device and/or system that introduced the error to provide correction. As a result, these errors cannot spread and wreak havoc downstream in enterprise computing system 1420, database/date store 1430 or other database/data lake/cloud storage 1440.

FIG. 15 illustrates TYPO (IS A TRADEMARK/SERVICEMARK OF QUATRO CONSULTING LLC) data quality barrier for enterprise information systems, in accordance with some embodiments. Client input devices 1510 deliver inputted information to hyperintelligence system TYPO 1550 before passing inputted information/data to enterprise computing system 1520. Enterprise computing system 1520 delivers the inputted information or data to a database/data store 1530. Database/data store 1530 delivers the inputted information/data to other database/data lake/cloud storage 1540. TYPO (IS A TRADEMARK/SERVICEMARK OF QUATRO CONSULTING LLC) 1550 inspects data in motion from client input devices 1510 before it enters enterprise computing system 1520. FIG. 15 depicts a first or external data quality barrier 1560 carried out by TYPO (IS A TRADEMARK/SERVICEMARK OF QUATRO CONSULTING LLC) 1550. TYPO (IS A TRADEMARK/SERVICEMARK OF QUATRO CONSULTING LLC) 1550 also implements a second or internal data quality barrier 1570. TYPO (is a trademark/servicemark of Quatro Consulting LLC) Audit 1580 inspects information/data at rest that was previously inputted and/or saved in database/data store in the enterprise computing system 1520.

FIG. 16 illustrates TYPO (IS A TRADEMARK/SERVICEMARK OF QUATRO CONSULTING LLC) 1600 integrated into a traditional data quality tool 1660, in accordance with some embodiments. FIG. 16 illustrates client input devices 1610 delivering inputted information to an enterprise computing system 1620. Enterprise computing system 1620 delivers the inputted information or data to a database/data store 1630. Database/data store 1630 delivers the inputted information/data to other database/data lake/cloud storage 1640. As shown, traditional data quality tool 1600 quarantines data errors in the error database/data store 1650 after the inputted information data has been saved to database/data store 1630. TYPO 1600 (IS A TRADEMARK/SERVICEMARK OF QUATRO CONSULTING LLC) is integrated into traditional data quality tool 1660 and uses the methods and systems described above in accordance with the embodiments with artificial intelligence (AI) to detect errors prior to delivering inputted information/data to database/data store 1640. This enables correction of errors prior to storage and propagation into downstream systems and reports.

The sequence diagrams shown and described in connection with FIGS. 7-10 illustrate the specific application/use case of the Hyperintelligence System 300 namely data quality shown and described above in connection with FIGS. 13-16. FIG. 11 is not limited to any application/use case whereas FIG. 12 may be used for an e-commerce application/use case in accordance with the embodiments.

Miscellaneous: Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with some embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, by a computing system having one or more processors and memory, inputted data from a first computing device or other device or system, the inputted data having a destination at an enterprise computing system;
providing, by the computing system, the inputted data to a hyperintelligence system, wherein the hyperintelligence system executes one or more artificial intelligence models;
determining, by the computing system and by executing the one or more artificial intelligence models of the hyperintelligence system, that a predicted error is present in the inputted data;
implementing, by the computing system, a blockchain service to store the inputted data, to store the predicted error, and to store additional information;
sending, by the computing system, a notification to a client device indicating that the predicted error is present in the inputted data;
receiving, by the computing system, additional information from one or more computing devices or systems indicating that a classification of the predicted error is accurate or inaccurate;
modifying, by the computing system, one or more artificial intelligence models of the hyperintelligence system based on the additional information;
modifying, by the computing system and based on the additional information, the inputted data to produce corrected inputted data; and
sending, by the computing system, the corrected inputted data to the enterprise computing system.

2. The method of claim 1, comprising:
building, by the computing system, one or more additional artificial intelligence models based on information obtained from one or more computing devices or systems indicating at least one of (i) that predicted errors are actual errors, (ii) that predicted errors are not actual errors, or (iii) corrections to the predicted errors.

3. The method of claim 1, comprising:
analyzing, by the computing system, a dataset that includes information that is obtained in relation to the enterprise computing system to determine an amount of data included in the dataset;
determining, by the computing system, that the amount of data is at least a threshold amount of data; and
analyzing, by the computing system, the inputted data by executing the one or more artificial intelligence models after determining that the amount of data is at least the threshold amount of data.

4. The method of claim 1, wherein the notification includes a predicted correction to the predicted error and the additional information confirms the predicted correction.

5. The method of claim 1, comprising:
during a build phase of the hyperintelligence system:
storing, by the computing system, a plurality of artificial intelligence algorithms in a cache;
identifying, by the computing system, an artificial intelligence algorithm of the plurality of artificial intelligence algorithms to use to build a plurality of artificial intelligence models in relation to the inputted data;
storing, by the computing system, the plurality of artificial intelligence models in an additional cache;
during an execution phase of the hyperintelligence system:
identifying, by the computing system, an artificial intelligence model of the plurality of artificial intelligence models to execute in relation to the inputted data; and
retrieving, by the computing system, the artificial intelligence model from the cache.

6. The method of claim 1, wherein:
the inputted data is represented by a data table that includes a number of columns and a number of rows, and
the method comprises:
performing, by the computing system, an analysis of a set of values represented by at least a portion of the number of columns of the data table with respect to the row corresponding to the current inputted data of the number of rows of the data table in relation to label data of previously analyzed inputted data, wherein the label data indicates correct and incorrect values of additional rows of additional data tables that represent the previously analyzed inputted data;
determining, by the computing system and based on the analysis, that the set of values of the row corresponding to the current inputted data has at least a threshold amount of similarity with at least one additional row of at least one additional data table; and
determining, by the computing system, that an error is present in the row corresponding to the current inputted data; and
the one or more artificial intelligence models are not executed with respect to the row corresponding to the current inputted data.

7. The method of claim 6, comprising:
determining, by the computing system, that an expiration time of labels included in the label data is less than a threshold expiration time.

8. The method of claim 6, comprising:
generating, by the computing system, a current hash created from the values included in the row corresponding to the current inputted data;

determining, by the computing system, that one or more previously created hashes correspond to the current hash; and analyzing, by the computing system, the current hash with respect to the one or more previously created hashes to determine an amount of similarity between the set of values of the row corresponding to the current inputted data and the label data of previously analyzed inputted data.

9. The method of claim 1, comprising:

obtaining, by the computing system, feedback corresponding to the inputted data indicating at least one of (i) that predicted errors are actual errors, (ii) that predicted errors are not actual errors, or (iii) corrections to the predicted errors, wherein the feedback is obtained from at least one of a user of one or more computing devices or from an administrator of the hyperintelligence system.

10. The method of claim 9, comprising:

generating, by the computing system, one or more labels based on the feedback that are applied to at least one of one or more rows or one or more columns of a data table stored by a data store of the hyperintelligence system, wherein the one or more labels indicate a classification of the predicted error.

11. The method of claim 9, wherein the feedback is obtained for inputted data captured in real time or near real time.

12. A system comprising:

one or more hardware processors; and memory storing computer-readable instructions that, when executed by the one or more hardware processors, cause the one or more hardware processors to perform operations comprising:

receiving inputted data from a first computing device or other device or system, the inputted data having a destination at an enterprise computing system;

providing inputted data to a hyperintelligence system, wherein the hyperintelligence system builds and executes one or more artificial intelligence models;

determining, by executing the one or more artificial intelligence models of the hyperintelligence system, that a predicted error is present in the inputted data;

implementing a blockchain service to store the inputted data, to store the predicted error, and to store additional information;

sending a notification to a client device indicating that the predicted error is present in the inputted data;

receiving additional information from one or more computing devices or systems indicating that a classification of the predicted error is accurate or inaccurate;

modifying artificial intelligence models of the hyperintelligence system based on the additional information;

modifying, based on the additional information, the inputted data to produce corrected inputted data; and sending, by the computing system, the corrected inputted data to the enterprise computing system.

13. The system of claim 12, wherein the memory stores additional computer-readable instructions that, when executed by the one or more hardware processors, cause the one or more hardware processors to perform additional operations comprising:

building one or more additional artificial intelligence models based on information obtained from one or more computing devices or systems indicating at least one of (i) that predicted errors are actual errors, (ii) that predicted errors are not actual errors, or (iii) corrections to the predicted errors.

14. The system of claim 12, wherein:

the inputted data is captured in real time or near real time from a stream of data generated by one or more devices; and the memory stores additional computer-readable instructions that, when executed by the one or more hardware processors, cause the one or more hardware processors to perform additional operations comprising:

sending the corrected inputted data to an enterprise computing system.

15. The system of claim 12, wherein:

the inputted data is stored in one or more data stores of an enterprise computing system; and the memory stores additional computer-readable instructions that, when executed by the one or more hardware processors, cause the one or more hardware processors to perform additional operations comprising:

updating the one or more data stores based on the corrected inputted data.

16. The system of claim 12, wherein the notification indicates a predicted decision with a predicted correction of the predicted error.

17. The system of claim 12, wherein:

the one or more artificial intelligence models include a first artificial intelligence model and a second artificial intelligence model and the memory stores additional computer-readable instructions that, when executed by the one or more hardware processors, cause the one or more hardware processors to perform additional operations comprising:

executing the first artificial intelligence model with respect to the inputted data to determine a first result;

storing the first result in a results cache;

executing the second artificial intelligence model with respect to the inputted data to determine a second result;

storing the second result in the results cache;

combining the first result and the second result to determine a decision with respect to the inputted data, the decision indicating the predicted error.

18. The system of claim 17, wherein:

the first result indicates a first probability of an error being present in the inputted data;

the second result indicates a second probability of an error being present in the inputted data; and the memory stores additional computer-readable instructions that, when executed by the one or more hardware processors, cause the one or more hardware processors to perform additional operations comprising:

determining a weighted average of the first result and the second result; and determining that the weighted average is at least a threshold probability of an error being present in the inputted data.

19. A method comprising:

receiving, by a computing system having one or more processors and memory, a request to build one or more artificial intelligence models to determine a result based on inputted data;

retrieving, by the computing system, a template that corresponds to the artificial intelligence model;

determining, by the computing system and based on the template, a type of the artificial intelligence model, metadata related to the result, a runtime for the artificial intelligence model, and an algorithm package that corresponds to the artificial intelligence model;

initializing, by the computing system, one or more functions to build the artificial intelligence model, the functions being specified by the template;

performing, by the computing system, a build process in which one or more functions are executed to generate an artificial intelligence model, wherein the build process may include use of at least a portion of prepared data;

receiving, by the computing system, a request to execute the built artificial intelligence models with respect to the inputted data;

determining, by the computing system and using the built artificial intelligence model, one or more results with respect to the inputted data, wherein the one or more results correspond to at least one of binary classification, multi-classification, multi-label classification, probability, or continuous; and determining, by the computing system, a decision related to the inputted data.

20. The method of claim 19, comprising:
determining, by the computing system, a number of computing nodes to allocate to build or execute the artificial intelligence model;
determining, by the computing system, a number of processors to allocate to build or execute the artificial intelligence model;
determining, by the computing system, a speed of the number processors to build or execute the artificial intelligence model;
determining, by the computing system, an amount of memory to build or execute the artificial intelligence model; and
determining, by the computing system, a network speed at which to perform network communication.

21. The method of claim 19, comprising:
receiving the inputted data from a first computing device or other device or system, the inputted data having a destination at an enterprise computing system;
providing the inputted data to a hyperintelligence system, wherein the hyperintelligence system executes the artificial intelligence model;
determining, by executing the artificial intelligence model of the hyperintelligence system, that a predicted error is present in the inputted data;
sending a notification to a client device indicating that the predicted error is present in the inputted data;
receiving additional information from one or more computing devices or systems indicating that the predicted error is an actual error;
modifying artificial intelligence models of the hyperintelligence system based on the additional information;
modifying, based on the additional information, the inputted data to produce corrected inputted data; and
sending, by the computing system, the corrected inputted data to the enterprise computing system.

22. The method of claim 21, comprising:
building one or more additional artificial intelligence models based on information obtained from one or more computing devices or systems indicating at least one of (i) that predicted errors are actual errors, (ii) that predicted errors are not actual errors, or (iii) corrections to the predicted errors.

23. The method of claim 21, wherein:
for a first configuration, the hyperintelligence system resides on a client device that is not included in the enterprise computing system;
for a second configuration, the hyperintelligence system resides within the enterprise computing system;
for a third configuration, the hyperintelligence system resides on a computing system that is intermediate between the first computing device generating the inputted data and the enterprise computing system; and
for a fourth configuration of the hyperintelligence system, a combination at least two of the first configuration, the second configuration, or the third configuration.

24. The method of claim 19, comprising:
analyzing, by the computing system, the inputted data to determine that a first portion of the inputted data is unstructured data and a second portion of the inputted data is structured data;
transforming, by the computing system, the first portion of the inputted data to transformed data that is structured data; and
storing, by the computing system, the transformed data and the second portion of the inputted data in a number of data tables.

25. The method of claim 19, comprising:
analyzing, by the computing system, information related to a number of data tables to determine relationships between individual data tables of the number of data tables, the relationships indicating that the individual data tables correspond to at least one of a parent data table or a child data table.

26. The method of claim 25, comprising:
generating, by the computing system, individual keys for individual columns of the number of data tables based on information related to the individual columns; and
determining, by the computing system, a group of data tables of the number of data tables that correspond to a category of data.

27. The method of claim 26, comprising:
determining, by the computing system and based on keys of one or more columns of the group of data tables, a plurality of subgroups of the group of data tables with individual subgroups of the plurality of subgroups corresponding to individual subsets of the category; and
generating, by the computing system, a plurality of artificial intelligence models, individual artificial intelligence models of the plurality of artificial intelligence models being executable to determine error predictions that correspond to an individual subset of the category.

28. A method comprising:
during a build phase of a hyperintelligence system:
storing, by a computing system having one or more processors and memory, a plurality of artificial intelligence algorithms in a cache;
identifying, by the computing system, an artificial intelligence algorithm of the plurality of artificial intelligence algorithms to use to build a plurality of artificial intelligence models in relation to the inputted data;
storing, by the computing system, the plurality of artificial intelligence models in an additional cache;
during an execution phase of the hyperintelligence system:
receiving, by the computing system, inputted data from a first computing device or other device or system, the inputted data having a destination at an enterprise computing system;

providing, by the computing system, the inputted data to the hyperintelligence system;
identifying, by the computing system, an artificial intelligence model of the plurality of artificial intelligence models to execute in relation to the inputted data;
retrieving, by the computing system, the artificial intelligence model from the additional cache;
determining, by the computing system and by executing the artificial intelligence model of the hyperintelligence system, that a predicted error is present in the inputted data;
sending, by the computing system, a notification to a client device indicating that the predicted error is present in the inputted data;
receiving, by the computing system, additional information from one or more computing devices or systems indicating that the predicted error is an actual error;
modifying, by the computing system, one or more artificial intelligence models of the hyperintelligence system based on the additional information;
modifying, by the computing system and based on the additional information, the inputted data to produce corrected inputted data; and
sending, by the computing system, the corrected inputted data to the enterprise computing system.

29. A method comprising:
receiving, by a computing system having one or more processors and memory, inputted data from a first computing device or other device or system, the inputted data having a destination at an enterprise computing system and the inputted data is represented by a data table that includes a number of columns and a number of rows;
providing, by the computing system, the inputted data to a hyperintelligence system, wherein the hyperintelligence system executes one or more artificial intelligence models;
determining, by the computing system and by executing the one or more artificial intelligence models of the hyperintelligence system, that a predicted error is present in the inputted data;
sending, by the computing system, a notification to a client device indicating that the predicted error is present in the inputted data;
receiving, by the computing system, additional information from one or more computing devices or systems indicating that the predicted error is an actual error;
modifying, by the computing system, one or more artificial intelligence models of the hyperintelligence system based on the additional information;
modifying, by the computing system and based on the additional information, the inputted data to produce corrected inputted data;
sending, by the computing system, the corrected inputted data to the enterprise computing system;
performing, by the computing system, an additional analysis of a set of values represented by at least a portion of the number of columns of the data table with respect to the row corresponding to the inputted data of the number of rows of the data table in relation to label data of previously analyzed inputted data, wherein the label data indicates correct and incorrect values of additional rows of additional data tables that represent the previously analyzed inputted data;
determining, by the computing system and based on the analysis, that the set of values of the row corresponding to the current inputted data has at least a threshold amount of similarity with at least one additional row of at least one additional data table; and
determining, by the computing system, that an additional error is present in the row corresponding to the inputted data; and
the one or more artificial intelligence models are not executed with respect to the row corresponding to the inputted data.

30. The method of claim 29, comprising:
determining, by the computing system, that an expiration time of labels included in the label data is less than a threshold expiration time.

31. The method of claim 29, comprising:
generating, by the computing system, a current hash created from the values included in the row corresponding to the current inputted data;
determining, by the computing system, that one or more previously created hashes correspond to the current hash; and
analyzing, by the computing system, the current hash with respect to the one or more previously created hashes to determine an amount of similarity between the set of values of the row corresponding to the current inputted data and the label data of previously analyzed inputted data.

32. A system comprising:
one or more hardware processors; and
memory storing computer-readable instructions that, when executed by the one or more hardware processors, cause the one or more hardware processors to perform operations comprising:
receiving inputted data from a first computing device or other device or system, the inputted data having a destination at an enterprise computing system;
providing inputted data to a hyperintelligence system, wherein the hyperintelligence system builds and executes a first artificial intelligence model and a second artificial intelligence model;
executing the first artificial intelligence model with respect to the inputted data to determine a first result;
storing the first result in a results cache;
executing the second artificial intelligence model with respect to the inputted data to determine a second result;
storing the second result in the results cache;
combining the first result and the second result to determine a decision with respect to the inputted data, the decision indicating a predicted error;
sending a notification to a client device indicating that the predicted error is present in the inputted data;
receiving additional information from one or more computing devices or systems indicating that the predicted error is an actual error;
modifying artificial intelligence models of the hyperintelligence system based on the additional information;
modifying, based on the additional information, the inputted data to produce corrected inputted data; and
sending, by the computing system, the corrected inputted data to the enterprise computing system.

33. The system of claim 32, wherein:
the first result indicates a first probability of an error being present in the inputted data;
the second result indicates a second probability of an error being present in the inputted data; and
the memory stores additional computer-readable instructions that, when executed by the one or more hardware processors, cause the one or more hardware processors to perform additional operations comprising:

determining a weighted average of the first result and the second result; and determining that the weighted average is at least a threshold probability of an error being present in the inputted data.

\* \* \* \* \*